United States Patent
Bai et al.

(10) Patent No.: US 12,418,813 B2
(45) Date of Patent: Sep. 16, 2025

(54) UNIFIED TRANSMISSION CONFIGURATION INDICATOR STATE INDICATION FOR CROSS-LINK INTERFERENCE MEASUREMENT

(71) Applicant: QUALCOMM Incorporated, San Diego, CA (US)

(72) Inventors: Tianyang Bai, Somerville, NJ (US); Yan Zhou, San Diego, CA (US); Qian Zhang, Basking Ridge, NJ (US); Junyi Li, Fairless Hills, PA (US); Tao Luo, San Diego, CA (US)

( * ) Notice: Subject to any disclaimer, the term of this patent is extended or adjusted under 35 U.S.C. 154(b) by 618 days.

(21) Appl. No.: 17/715,655

(22) Filed: Apr. 7, 2022

(65) Prior Publication Data

US 2023/0328557 A1   Oct. 12, 2023

(51) Int. Cl.
*H04W 24/08*   (2009.01)
*H04W 72/23*   (2023.01)

(52) U.S. Cl.
CPC ........... *H04W 24/08* (2013.01); *H04W 72/23* (2023.01)

(58) Field of Classification Search
None
See application file for complete search history.

(56) References Cited

U.S. PATENT DOCUMENTS

2021/0250797 A1* 8/2021 Karjalainen .......... H04L 1/0026
2021/0258964 A1  8/2021 Khoshnevisan et al.
2021/0328692 A1 10/2021 Zhang et al.
2022/0086843 A1  3/2022 Ying et al.
2023/0100135 A1* 3/2023 Liu ...................... H04B 7/0695
                                                           370/252
2023/0327787 A1 10/2023 Bai et al.

FOREIGN PATENT DOCUMENTS

WO   WO-2021248397 A1   12/2021
WO   WO-2022147755 A1 *  7/2022 ........... H04B 7/0456
WO   WO-2023055264 A1    4/2023

OTHER PUBLICATIONS

Partial International Search Report—PCT/US2023/015694—ISA/EPO—Jun. 15, 2023 (2202519WO).
International Search Report and Written Opinion—PCT/US2023/015694—ISA/EPO—Sep. 4, 2023 (2202519WO).

* cited by examiner

*Primary Examiner* — Mohammad S Anwar

(57) ABSTRACT

Methods, systems, and devices for wireless communications are described. A user equipment (UE) may receive control signaling (e.g., from a network entity) indicating a CLI measurement resource and an associated transmission configuration indicator (TCI) state. The UE may generate and transmit a CLI report to the network entity using the CLI measurement resource and the beam associated with the indicated TCI state. In some cases, the control signaling may indicate to use the same TCI state as another dedicated downlink channel configured for the UE. In some cases, the control signaling may indicate a unified TCI state to apply for the CLI measurement. In some cases, a UE may be configured to communicate with multiple transmission and reception points (TRPs). The TCI state to apply to the CLI measurement may be based on the TRP scheduling the CLI measurement.

30 Claims, 17 Drawing Sheets

UNIFIED TRANSMISSION CONFIGURATION INDICATOR STATE INDICATION FOR CROSS-LINK INTERFERENCE MEASUREMENT

FIELD OF TECHNOLOGY

The following relates to wireless communications, including unified transmission configuration indicator state indication for cross-link interference measurement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support unified transmission configuration indicator state indication for cross-link interference (CLI) measurement. For example, the described techniques provide for indicating a specific transmission configuration indicator (TCI) state associated with a CLI measurement. A user equipment (UE) may receive control signaling (e.g., from a network entity) indicating a CLI measurement resource and an associated TCI state. The UE may generate and transmit a CLI report to the network entity using the CLI measurement resource and the receive beam associated with the indicated TCI state. In some cases, the control signaling may indicate to use the same TCI state as another dedicated downlink channel configured for the UE, for example a physical downlink control channel or a physical downlink shared channel. In some cases, the control signaling may indicate a unified TCI state for the CLI measurement. In some cases, a UE may be configured to communicate with multiple transmission and reception points (TRPs), which may be each be associated with a respective control resource set (CORESET) pool. The UE may receive one or more control messages indicating an association between each CORESET pool and a respective TCI state. When a TRP schedules a CLI measurement for a UE, the UE may apply the beam associated with the TCI state associated with the CORESET pool associated with the scheduling TRP to the scheduled CLI measurement.

A method for wireless communications at a user equipment (UE) is described. The method may include receiving, from a network entity, control signaling indicating a CLI measurement resource and a TCI state the UE is to apply for CLI measurement in the CLI measurement resource, generating a CLI measurement of the CLI measurement resource using a receive beam associated with the TCI state, and transmitting, to the network entity, a message indicating the CLI measurement.

An apparatus for wireless communications at a UE is described. The apparatus may include a processor, memory coupled with the processor, and instructions stored in the memory. The instructions may be executable by the processor to cause the apparatus to receive, from a network entity, control signaling indicating a CLI measurement resource and a TCI state the UE is to apply for CLI measurement in the CLI measurement resource, generate a CLI measurement of the CLI measurement resource using a receive beam associated with the TCI state, and transmit, to the network entity, a message indicating the CLI measurement.

Another apparatus for wireless communications at a UE is described. The apparatus may include means for receiving, from a network entity, control signaling indicating a CLI measurement resource and a TCI state the UE is to apply for CLI measurement in the CLI measurement resource, means for generating a CLI measurement of the CLI measurement resource using a receive beam associated with the TCI state, and means for transmitting, to the network entity, a message indicating the CLI measurement.

A non-transitory computer-readable medium storing code for wireless communications at a UE is described. The code may include instructions executable by a processor to receive, from a network entity, control signaling indicating a CLI measurement resource and a TCI state the UE is to apply for CLI measurement in the CLI measurement resource, generate a CLI measurement of the CLI measurement resource using a receive beam associated with the TCI state, and transmit, to the network entity, a message indicating the CLI measurement.

In some examples of the method, apparatuses, and non-transitory computer-readable medium described herein, receiving the control signaling may include operations, features, means, or instructions for receiving an indication that the TCI state may be associated with a downlink channel for the UE.

In some examples of the method, apparatuses, and non-transitory computer-readable medium described herein, receiving the indication that the TCI state may be associated with the downlink channel for the UE may include operations, features, means, or instructions for receiving an indication of a unified TCI state.

Some examples of the method, apparatuses, and non-transitory computer-readable medium described herein may further include operations, features, means, or instructions for receiving a downlink control information message indicating the TCI state.

Some examples of the method, apparatuses, and non-transitory computer-readable medium described herein may further include operations, features, means, or instructions for receiving a control message indicating a set of TCI states associated with a set of CORESET pools, where each CORESET pool of the set of CORESET pools corresponds to one or more CORESETs and receiving, with the control signaling, an indication of a CORESET pool of the set of CORESET pools, where the TCI state may be based on the indication of the CORESET pool.

In some examples of the method, apparatuses, and non-transitory computer-readable medium described herein, receiving the indication of the CORESET pool of the set of CORESET pools may include operations, features, means, or instructions for receiving the control signaling from a TRP associated with the CORESET pool, where each CORESET pool of the set of CORESET pools may be associated with a respective TRP.

In some examples of the method, apparatuses, and non-transitory computer-readable medium described herein, receiving the control signaling may include operations, features, means, or instructions for receiving a first control message indicating the CLI measurement resource and a first CORESET pool of the set of CORESET pools, receiving a second control message indicating the CLI measurement resource and a second CORESET pool of the set of CORESET pools; and may further include operations, features, means, or instructions for generating a first CLI measurement of the CLI measurement resource using a first receive beam associated with a first TCI state associated with the first CORESET pool and generating a second CLI measurement of the CLI measurement resource using a second receive beam associated with a second TCI state associated with the second CORESET pool, where the message indicates the first CLI measurement and the second CLI measurement.

Some examples of the method, apparatuses, and non-transitory computer-readable medium described herein may further include operations, features, means, or instructions for receiving a control message indicating a second TCI state associated with a set of CLI measurement resources including the CLI measurement resource, where the CLI measurement resource includes an aperiodic or a semi-periodic CLI measurement resource and receiving, with the control signaling, an indication to overwrite the second TCI state with the TCI state for the CLI measurement resource.

In some examples of the method, apparatuses, and non-transitory computer-readable medium described herein, receiving the control signaling may include operations, features, means, or instructions for receiving a radio resource control message configuring the CLI measurement resource and the TCI state, where the CLI measurement resource includes a periodic CLI measurement resource.

In some examples of the method, apparatuses, and non-transitory computer-readable medium described herein, the CLI measurement resource includes a layer one sounding reference signal resource or a layer one received signal strength indicator resource.

A method is described. The method may include transmitting, to a UE, control signaling indicating a CLI measurement resource and a TCI state to apply for CLI measurement in the CLI measurement resource and receiving, from the UE, a message indicating a CLI measurement of the CLI measurement resource measured at the UE using a beam associated with the TCI state.

An apparatus is described. The apparatus may include a processor, memory coupled with the processor, and instructions stored in the memory. The instructions may be executable by the processor to cause the apparatus to transmit, to a UE, control signaling indicating a CLI measurement resource and a TCI state to apply for CLI measurement in the CLI measurement resource and receive, from the UE, a message indicating a CLI measurement of the CLI measurement resource measured at the UE using a beam associated with the TCI state.

Another apparatus is described. The apparatus may include means for transmitting, to a UE, control signaling indicating a CLI measurement resource and a TCI state to apply for CLI measurement in the CLI measurement resource and means for receiving, from the UE, a message indicating a CLI measurement of the CLI measurement resource measured at the UE using a beam associated with the TCI state.

A non-transitory computer-readable medium storing code is described. The code may include instructions executable by a processor to transmit, to a UE, control signaling indicating a CLI measurement resource and a TCI state to apply for CLI measurement in the CLI measurement resource and receive, from the UE, a message indicating a CLI measurement of the CLI measurement resource measured at the UE using a beam associated with the TCI state.

In some examples of the method, apparatuses, and non-transitory computer-readable medium described herein, transmitting the control signaling may include operations, features, means, or instructions for transmitting an indication that the TCI state may be associated with a downlink channel for the UE.

In some examples of the method, apparatuses, and non-transitory computer-readable medium described herein, transmitting the indication that the TCI state may be associated with the downlink channel for the UE may include operations, features, means, or instructions for transmitting an indication of a unified TCI state.

Some examples of the method, apparatuses, and non-transitory computer-readable medium described herein may further include operations, features, means, or instructions for transmitting, to the UE, a downlink control information message indicating the TCI state.

Some examples of the method, apparatuses, and non-transitory computer-readable medium described herein may further include operations, features, means, or instructions for transmitting, to the UE, a control message indicating a set of TCI states associated with a set of CORESET pools, where each CORESET pool of the set of CORESET pools corresponds to one or more CORESETs and transmitting, with the control signaling, an indication of a CORESET pool of the set of CORESET pools, where the TCI state may be based on the indication of the CORESET pool.

In some examples of the method, apparatuses, and non-transitory computer-readable medium described herein, transmitting the indication of the CORESET pool of the set of CORESET pools may include operations, features, means, or instructions for transmitting the control signaling from a TRP associated with the CORESET pool, where each CORESET pool of the set of CORESET pools may be associated with a respective TRP.

In some examples of the method, apparatuses, and non-transitory computer-readable medium described herein, transmitting the indication of the CORESET pool of the set of CORESET pools may include operations, features, means, or instructions for transmitting a first control message indicating the CLI measurement resource and a first CORESET pool of the set of CORESET pools and transmitting a second control message indicating the CLI measurement resource and a second CORESET pool of the set of CORESET pools, where the message indicates a first CLI measurement measured at the UE using a first beam associated with a first TCI state associated with the first CORESET pool and a second CLI measurement measured at the UE using a second beam associated with a second TCI state associated with the second CORESET pool.

Some examples of the method, apparatuses, and non-transitory computer-readable medium described herein may further include operations, features, means, or instructions for transmitting, to the UE, a control message indicating a second TCI state associated with a set of CLI measurement resources including the CLI measurement resource, where the CLI measurement resource includes an aperiodic or a semi-periodic CLI measurement resource and transmitting, with the control signaling, an indication to overwrite the second TCI state with the TCI state for the CLI measurement resource.

In some examples of the method, apparatuses, and non-transitory computer-readable medium described herein, transmitting the control signaling may include operations, features, means, or instructions for transmitting a radio resource control message configuring the CLI measurement resource and the TCI state, where the CLI measurement resource includes a periodic CLI measurement resource.

In some examples of the method, apparatuses, and non-transitory computer-readable medium described herein, the CLI measurement resource includes a layer one sounding reference signal resource and a layer one received signal strength indicator resource.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
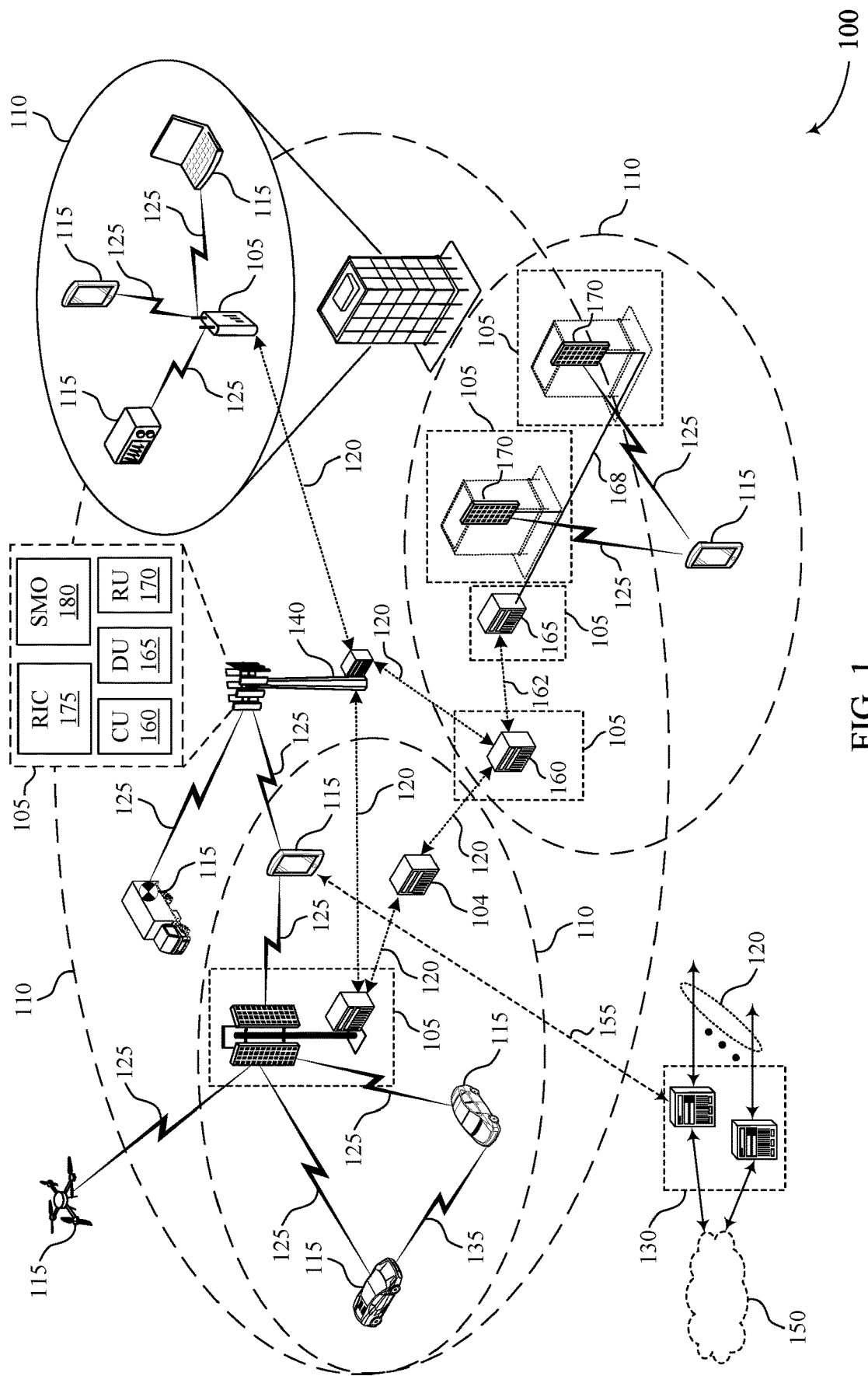
FIG. 1 illustrates an example of a wireless communications system that supports unified transmission configuration indicator (TCI) state indication for cross-link interference (CLI) measurement in accordance with one or more aspects of the present disclosure.

A user equipment (UE) may experience cross-link interference (CLI) attributable to signals transmitted by other UEs. For example, a "victim" UE may experience CLI from signals transmitted by an "aggressor" UE in cases where downlink resources of the victim UE overlap with uplink resources of the aggressor UE, thereby resulting in CLI. In some wireless communications systems, UEs may be configured to perform CLI measurements (e.g., reference signal received power (RSRP) measurements or received signal strength indicator (RSSI) measurements) on signals transmitted by other UEs, and report measured CLI to the network so that the network may adjust resources allocated to the respective UEs to reduce CLI. A UE may receive an indication of a unified transmission configuration indicator (TCI) state for one or more signals. For example, a unified TCI type may indicate a common beam for more than one downlink transmissions. If the network does not indicate a specific receive beam to use when measuring CLI, the network may be unaware of which receive beam was used to measure the reported CLI. The network, however, may be most interested in CLI on specific receive beams for a UE as the CLI causes interference with signals received at the UE from the network for a specific receive beam.

Described techniques relate to indicating a specific TCI state associated with a CLI measurement. A UE may receive control signaling (e.g., from a network entity) indicating a CLI measurement resource and an associated TCI state. The UE may generate and transmit a CLI report to the network entity using the CLI measurement resource and the beam associated with the indicated TCI state. For example, the indicated TCI state may indicate which receive beam of a set of receive beams the UE is to use for generating the CLI measure of the indicated CLI measurement resource. In some cases, the control signaling may indicate to use the same TCI state as another dedicated downlink channel configured for the UE, for example a physical downlink control channel (PDCCH) or a physical downlink shared channel (PDSCH). In some cases, the control signaling may indicate a unified TCI state for the CLI measurement. In some cases, a UE may be configured to communicate with multiple transmission and reception points (TRPs), which may be each be associated with a respective control resource set (CORESET) pool. The UE may receive one or more control messages indicating an association between each CORESET pool and a respective TCI state. When a TRP schedules a CLI measurement for a UE, the UE may apply the beam associated with the TCI state associated with the CORESET pool associated with the scheduling TRP to the scheduled CLI measurement.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to unified TCI state indication for CLI measurement.

FIG. 1 illustrates an example of a wireless communications system 100 that supports unified TCI state indication for CLI measurement in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a TRP. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support unified TCI state indication for CLI measurement as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 may experience CLI attributable to signals transmitted by other UEs 115. For example, a "victim" UE 115 may experience CLI from signals transmitted by an "aggressor" UE 115 in cases where downlink resources of the victim UE 115 overlap with uplink resources of the aggressor UE 115, thereby resulting in CLI. In some wireless communications systems, UEs 115 may be configured to perform CLI measurements (e.g., RSRP measurements or RSSI measurements) on signals transmitted by other UEs 115, and report measured CLI to the network so that the network may adjust resources allocated to the respective UEs 115 to reduce CLI.

A UE 115 may receive an indication of a unified TCI state for one or more signals. For example, a unified TCI type 1 may indicate a common beam for at least one downlink transmission and at least one uplink transmission, a unified TCI type 2 may indicate a common beam for more than one downlink transmissions, and a unified TCI type 3 may indicate a common beam for more than one uplink transmissions. If the network does not indicate a specific receive beam to use when measuring CLI, the network may be unaware of which receive beam was used to measure the reported CLI. The network, however, may be most interested in CLI on specific receive beams for a UE as the CLI causes interference with signals received at the UE from the network for a specific receive beam.

A UE 115 may receive control signaling (e.g., from a network entity 105) indicating a CLI measurement resource and an associated TCI state. The UE 115 may generate and transmit a CLI report to the network entity 105 using the CLI measurement resource and the beam associated with the indicated TCI state. In some cases, the control signaling may indicate to use the same TCI state as another dedicated downlink channel configured for the UE 115, for example a PDCCH or a PDSCH. In some cases, the control signaling may indicate a unified TCI state to apply for the CLI measurement. In some cases, a UE 115 may be configured to communicate with TRPs, which may be each be associated with a respective CORESET pool. The UE 115 may receive one or more control messages indicating an association between each CORESET pool and a respective TCI state. When a TRP schedules a CLI measurement for a UE 115, the UE 115 may apply the beam associated with the TCI state associated with the CORESET pool associated with the scheduling TRP to the scheduled CLI measurement. Accordingly, the network may allocate resources to reduce CLI based on the measured CLI in accordance with the indicated receive beam.

Figure 2:
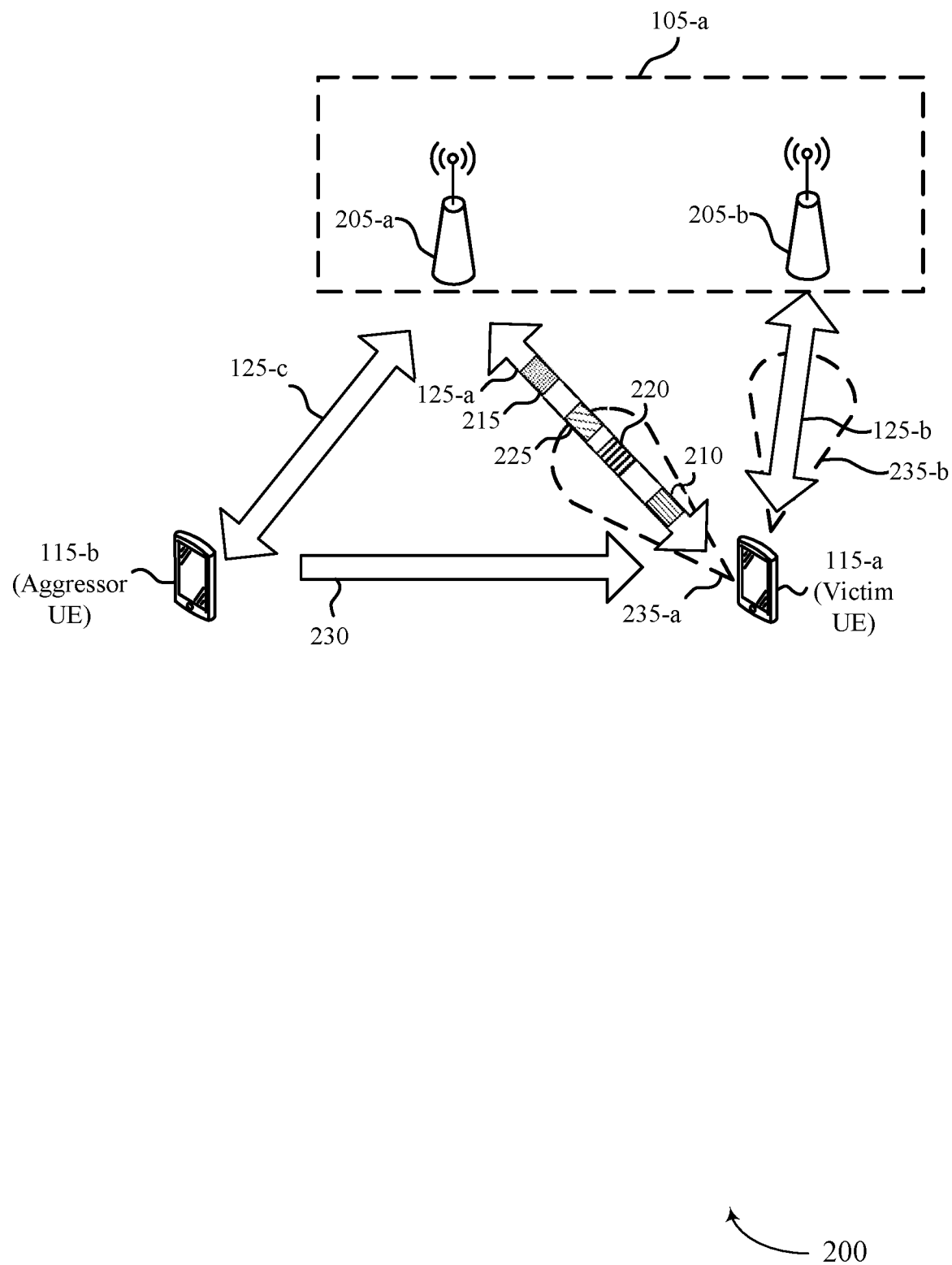
FIG. 2 illustrates an example of a wireless communications system that supports unified TCI state indication for CLI measurement in accordance with one or more aspects of the present disclosure.

FIG. 2 illustrates an example of a wireless communications system 200 that supports unified TCI state indication for CLI measurement in accordance with one or more aspects of the present disclosure. In some examples, the wireless communications system 200 may implement aspects of wireless communications system 100. The wireless communications system 200 may include a UE 115-a and a UE 115-b, which may be examples of UEs 115 as described herein. The wireless communications system 200 may include a network entity 105-a, which may be an example of a network entity 105 as described herein.

The UE 115-a may operate in a multiple TRP mode with TRP 205-a and TRP 205-b. In some cases, TRP 205-a and TRP 205-b may be located at a same network entity 105-a. In some cases, TRP 205-a and TRP 205-b may be located at different network entities.

UE 115-a may be capable of performing simultaneous communication with TRP 205-a and TRP 205-b. The UE 115-a may communicate with the TRP 205-a using a communication link 125-a. The UE 115-a may communicate with the TRP 205-b using a communication link 125-b. The UE 115-b may communicate with TRP 205-a using a communication link 125-c. The communication link 125-a, the communication link 125-b, and the communication link 125-c may include bi-directional links that enable both uplink and downlink communication. For example, the UE 115-a may transmit uplink signals, such as uplink control signals or uplink data signals, to the TRP 205-a using the communication link 125-a and the TRP 205-a may transmit downlink transmissions, such as downlink control signals or downlink data signals, to the UE 115-a using the communication link 125-a. The UE 115-a may transmit uplink signals, such as uplink control signals or uplink data signals, to the TRP 205-b using the communication link 125-b and the TRP 205-b may transmit downlink transmissions, such as downlink control signals or downlink data signals, to the UE 115-a using the communication link 125-b. By way of another example, the UE 115-b may transmit uplink signals, such as uplink control signals or uplink data signals, to the TRP 205-a using the communication link 125-c and the TRP 205-a may transmit downlink transmissions, such as downlink control signals or downlink data signals, to the UE 115-b using the communication link 125-c. In some examples, different TRPs (e.g., TRP 205-a and TRP 205-b) may have different TRP identifiers (IDs). In some examples, different TRPs may be identified through an association with other IDs, such as a CORESET pool index, close loop index, TCI ID, TCI group ID, or a sounding reference signal resource set ID.

In some examples, the UE 115-a (e.g., the victim UE) may experience CLI 230 when receiving downlink transmissions from the TRP 205-a via the communication link 125-a caused by uplink signals transmitted by the UE 115-b via the communication link 125-c if the uplink signals and downlink transmissions overlap (e.g., if the uplink and downlink transmissions have overlapping symbols).

CLI 230 may occur when the network configures multiple nearby UEs 115 with different TDD uplink and downlink slot formats. In particular, when an aggressor UE 115-b is transmitting uplink signals, a nearby victim UE 115-a may receive the uplink signals as CLI 230 within the configured downlink symbols of the victim UE 115-a if uplink symbols of the aggressor UE 115-b collide with (e.g., overlap with) at least one downlink symbol of the victim UE 115-a. The uplink signals transmitted by the aggressor UE 115-b may or may not be intended for the victim UE 115-a, such that the victim UE 115-a inadvertently "intercepts" the uplink signals intended for another wireless device (e.g., the network entity 105-a). In some cases, the network entity 105-a may operate in a full duplex mode (e.g., the network entity 105-a may serve downlink and uplink UEs 115 at the same time) which may result in increased CLI occurrences.

The victim UE 115-a may be configured to measure CLI 230 and report the measured CLI 230 to the network entity 105-a so that the network may allocate resources to reduce CLI 230. For example, the network may schedule uplink and downlink communications for the aggressor UE 115-b and the victim UE 115-a, respectively, in different time or frequency resources to avoid a strong CLI 230.

For example, the TRP 205-a may transmit control signaling 210 to the victim UE 115-a scheduling one or more CLI measurement resources (e.g., CLI measurement occasions). The TRP 205-a may also transmit control signaling to the aggressor UE 115-b scheduling one or more sounding reference signal (SRS) corresponding to the CLI measurement resources. The victim UE 115-a may receive and measure the SRS to determine the CLI strength. For example, the victim UE 115-a may transmit a message 215 to the TRP 205-a that includes CLI measurement results in terms of SRS RSRP or CLI RSSI. In some cases, the victim UE 115-a may transmit the CLI measurement message 215 periodically or based on defined triggering conditions.

In some cases, CLI measurement reports may be triggered by layer 3 signaling. CLI measurement reports triggered by layer 3 signaling may be collected by a CU, and may be associated with additional latency as compared to CLI measurement reports configured by layer 1 signaling, which may be collected by a DU. Filtering results of layer 3 scheduled CLI measurement reports over given beams 235 or time may be unsuitable for a fast layer 1 beam selection in response to interference variation. A CLI measurement report configuration update for layer 3 scheduled CLI measurement reports may involve RRC reconfiguration, which may be inefficient for latency and flexibility purposes. Layer 3 scheduled CLI measurement reports may not define which receive beam 235 to use to measure CLI. In some cases, which beam 235 to use to measure CLI may be determined by a UE implementation. In some cases, CLI in layer 3 scheduled CLI measurement reports may be averaged over different receive beams 235.

Layer 1 scheduled CLI measurement reports may provide enhanced flexibility and reduced latency. Layer 1 scheduled beams may also not define which receive beam 235 to use to measure CLI. For layer 1 beams, it may be beneficial for the network to know the CLI 230 on a particular victim UE 115-a receive beam 235 on which the victim UE 115-a will receive downlink transmissions (e.g., PDSCH or PDCCH messages) so that the network may schedule resources in order to mitigate CLI 230 on the particular beam 235.

In some cases, three types of unified TCI states may be defined. For example, a first type unified TCI state may include a separate downlink TCI state. A second type of unified TCI state may include a separate uplink TCI state. A third type of TCI state may include a joint uplink and downlink TCI state. In some cases, a unified TCI state may be shared by more than one channel. A separate downlink or a joint downlink and uplink TCI state may be activated by a downlink control information (DCI) message, and the activated TCI state may be used by the victim UE 115-a for reception of a dedicated PDSCH and/or PDCCH for the victim UE 115-a. In some cases, other channels or reference signals may be optionally configured in RRC whether to follow the same activated TCI stat as the dedicated PDSCH and/or PDCCH for the victim UE 115-*a*.

In some cases, for a separate downlink TCI state, mandatory channels may include UE dedicated PDCCH and PDSCH and optional channels (e.g., which may be configured in RRC) may include non-UE dedicated PDCCH and PDSCH, aperiodic channel state information (CSI) reference signal (CSI-RS) for CSI, and aperiodic CSI-RS for beam management.

In some cases, for a separate uplink TCI state, mandatory channels may include UE dedicated physical uplink shared channel (PUSCH) for both dynamic grant and configured grant and physical uplink control channel (PUCCH). For a separate uplink TCI state, optional channels may include SRS for codebook, SRS for non-codebook, SRS for antenna switching, and SRS for beam management.

In some cases, for a joint downlink and uplink TCI state, mandatory channels may include UE dedicated PDCCH, PDSCH, PUSCH (for dynamic grant and configured grant) and PUCCH. For a joint downlink and uplink TCI state, optional channels may include non-UE dedicated PDCCH and PDSCH, aperiodic CSI-RS, aperiodic CSI-RS for beam management, SRS for codebook, SRS for non-codebook, SRS for antenna switching, and SRS for beam management.

In some cases, if other channels or reference signals are configured to follow the same TCI state of victim UE 115-*a* as the dedicated PDCCH and/or PDSCH, the TCI state for the other channels or reference signals will also be autonomously updated by the DCI that updates the TCI state for the dedicated PDCCH and/or PDSCH. In some cases, if other channels or reference signals are configured not to follow the same TCI state of the victim UE 115-*a* as the dedicated PDCCH and/or PDSCH, a separate signaling will be used to configure the TCI state for the other channels or reference signals (e.g., via an RRC message or a MAC-CE). For example, if a CSI-RS or a tracking reference signal (TRS) is used to track the channel in the serving PDCCH and/or PDSCH beam, then the CSI-RS or TRS may be configured to share the same TCI state as the PDCCH and/or PDSCH, such that whenever the serving beam changes, the CSI-RS or TRS beam also follow the changed beam. As another example, if a CSI-RS is used to track certain beamforming direction (which need not be the serving beam), then the CSI-RS may be configured not to share the same TCI state as the PDCCH and/or PDSCH for the victim UE 115-*a*. In such cases, the TCI state of the CSI-RS may be separately configured by MAC-CE in RRC.

In some cases, a TCI state (e.g., a unified TCI state) may be indicated in control signaling 210 per CLI measurement resource. By indicating a TCI state per CLI resource, the network may configure the receive beam 235 corresponding to the reported CLI. Accordingly, the victim UE 115-*a* may generate a CLI measurement using the indicated receive beam 235 and may transmit a message 215 indicating the CLI measurement. For example, in the case of a single TRP 205 (e.g., if the victim UE 115-*a* is communicating with TRP 205-*a*), each CLI measurement resource or measurement resource set may be indicated whether to share the same unified TCI state as the dedicated PDCCH and PDSCH for the victim UE 115-*a*. In some cases (in a single TRP case), a DCI message 220 (e.g., DCI format 1_1 or DCI format 1_2) may update the UE dedicated PDCCH and PDSCH, which may also update the TCI state for the CLI measurement resource, measurement resource set, or both. In some cases, only aperiodic CLI measurement resources may be configured to follow the same TCI state as the dedicated PDSCH and PDCCH for the victim UE 115-*a*.

In some cases (in a single TRP case), if the victim UE 115-*a* is not configured to share the same unified TCI state as the dedicated PDCCH and PDSCH for the victim UE 115-*a*, the TCI state for the CLI measurement resource or measurement resource set may be indicated in RRC. In some cases, the TCI state for the CLI measurement resource or measurement resource set may be updated by a MAC-CE. In some cases, the quasi co-location (QCL) typed D source reference signal of the indicated TCI state may be a synchronization signal block (SSB) or a periodic or semi-periodic CSI-RS, where the SSB may be from a non-serving PCID.

In some cases, the victim UE 115-*a* may communicate with multiple TRPs 205. For example, the victim UE 115-*a* may communicate with the TRP 205-*a* and the TRP 205-*b*. In the case of multiple TRPs 205, multiple TCI states may be activated for dedicated PDCCH and PDSCH reception for the victim UE 115-*a* (e.g., each TCI state may be associated with reception from a particular TRP 205). For multiple DCI cases, each TRP 205 may be associated with a CORESET pool identifier. In multiple DCI cases, a CLI measurement resource, resource set, or both, may be associated with a CORESET pool identifier, for example in a control message 225 (e.g., in RRC). In some cases, if the CLI resource or resource set is indicated to share the same TCI state as the dedicated PDCCH and PDSCH for the victim UE 115-*a*, then the CLI measurement resource may follow the TCI state of the associated TRP 205. In some cases, the CLI measurement resource may be activated or triggered by the PDCCH or PDSCH from the same TRP 205 (e.g., control signaling 210 received from a TRP 205).

In some cases, a CLI measurement resource may be configured with multiple TCI state configurations, each associated with a CORESET pool identifier. The CLI measurement resource may be configured with multiple TCI state configurations, each associated with a CORESET pool identifier (e.g., via a control message 225). The CLI measurement resource may be scheduled or activated by multiple TRPs 205 (e.g., the victim UE 115-*a* may receive control signaling 210 from scheduling CLI measurement resources from multiple TRPs), but different receive beams 235 will be used for the CLI measurement resources depending on which TRP 205 transmitted the control signaling 210 activating or scheduling the CLI measurement resource. For example, beam 235-*a* may be used if the TRP 205-*a* transmitted the control signaling 210, and beam 235-*b* may be used if the TRP 205-*b* transmitted the control signaling 210.

In some cases, a DCI message 220 or MAC-CE activating an aperiodic or semi-periodic CLI measurement may also indicate a TCI state for the aperiodic or semi-periodic CLI measurement. In some examples, the indicated TCI state may overwrite the original TCI configuration associated with the aperiodic or semi-periodic CLI measurement (e.g., which may be configured in RRC). In some cases, where multiple configurations may be pre-configured for multiple CORESET pool identifiers, only the configuration corresponding to the same CORESET pool identifier as the activation signaling (DCI message 220 or MAC-CE) may be overwritten.

As described herein, a layer 1 scheduled CLI measurement report may better reflect current CLI as compared to a layer 3 scheduled CLI measurement report and may request a CLI measurement for an intended receive beam 235 with a low latency as dictated by traffic conditions. A layer 1 CLI measurement resource may include both a layer 1 SRS resource and a layer 1 RSSI resource. For a periodic CLI measurement resource, a corresponding TCI state may be RRC configured. For a semi-periodic CLI measurement resource, a corresponding TCI state may be dynamically updated via a MAC-CE (de)activating the resource or resource set or list. For an aperiodic CLI measurement resource, a corresponding TCI state may be RRC configured with each resource or resource set or list associated with a trigger state, which may be further dynamically indicated in a DCI message.

For example, a first CLI measurement resource is configured with TCI state X for CORESET pool X In the aperiodic CLI measurement resource case, the first CLI measurement resource may be associated with an aperiodic CLI measurement trigger state for an aperiodic CLI measurement report. When the aperiodic CLI measurement report is triggered (e.g., via control signaling 210), a different TCI state may be applied for the first CLI measurement, based on which CORESET pool the triggering control signaling 210 (e.g., which may be a DCI message) was received from. In the periodic or semi-periodic CLI measurement resource case, the first CLI measurement resource may be associated with a periodic or semi-periodic report configuration. Based on which CORESET pool the control signaling 210 (e.g., the activation RRC or MAC-CE) is received from, a different TCI state may be applied for the first CLI measurement. For example, both TRP 205-a and TRP 205-b may transmit activation commands (e.g., control signaling 210) for a first CLI measurement resource. The victim UE 115-a may measure the CLI using receive filters for each of TRP 205-a and TRP 205-b using the first CLI measurement resource. The victim UE 115-a may transmit indications of CLI measurements using the different receive filters for each of TRP 205-a and TRP 205-b in a CLI measurement report message 215.

Figure 3:
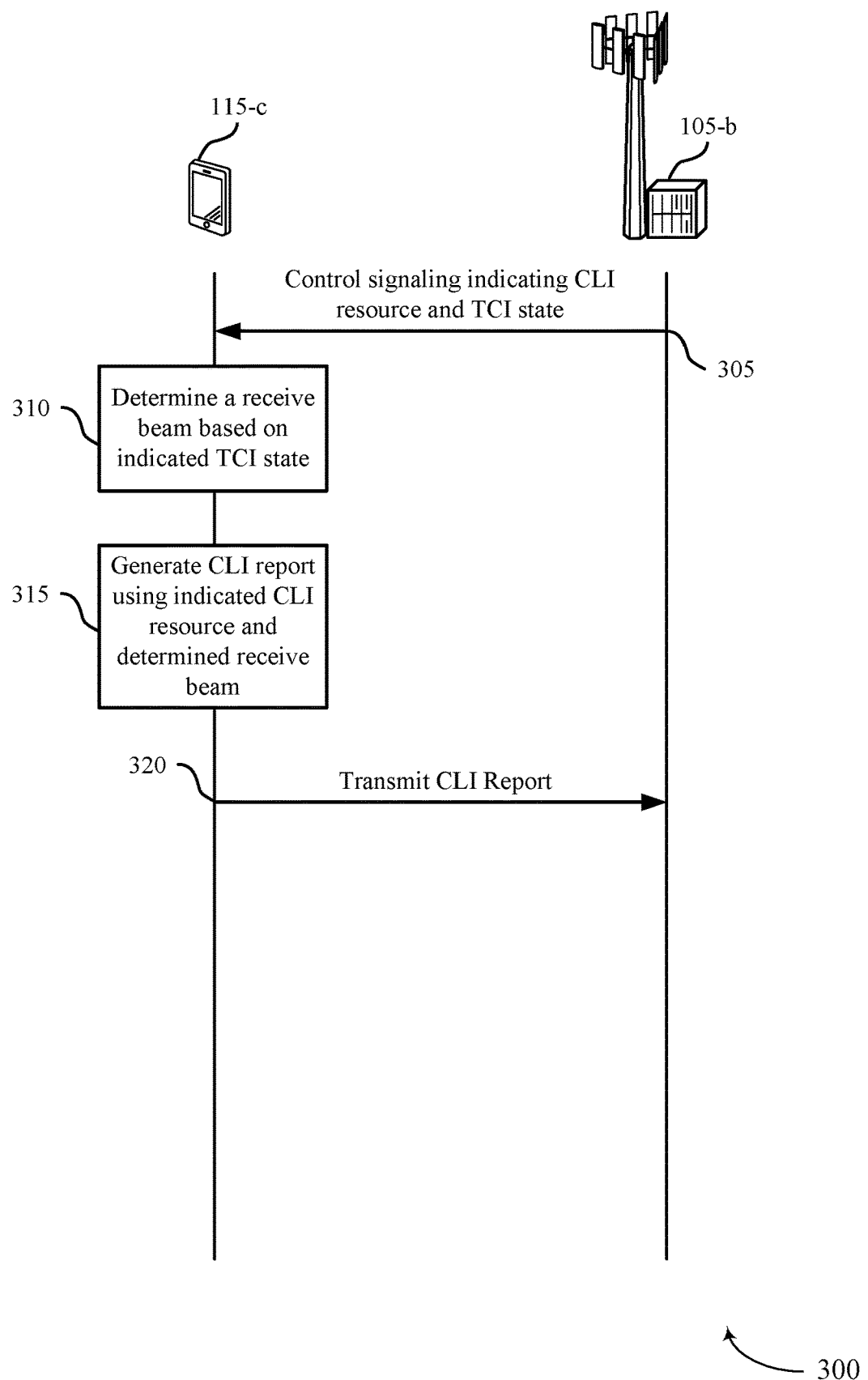
FIG. 3 illustrates an example of a process flow that supports unified TCI state indication for CLI measurement in accordance with one or more aspects of the present disclosure.

FIG. 3 illustrates an example of a process flow 300 that supports unified TCI state indication for CLI measurement in accordance with one or more aspects of the present disclosure. The process flow 300 may include a UE 115-c, which may be an example of a UE 115 as described herein. The process flow 300 may include a network entity 105-b, which may be an example of a network entity 105 as described herein. In the following description of the process flow 300, the operations between the network entity 105-b and the UE 115-c may be transmitted in a different order than the example order shown, or the operations performed by the network entity 105-b and the UE 115-c may be performed in different orders or at different times. Some operations may also be omitted from the process flow 300, and other operations may be added to the process flow 300.

At 305, the UE 115-c may receive, from the network entity 105-b, control signaling indicating a CLI measurement resource and a TCI state the UE 115-c is to apply for CLI measurement in the CLI measurement resource.

At 310, the UE 115-c may determine a receive beam to apply during the CLI measurement resource based on the indicated TCI state.

At 315, the UE 115-c may generate a CLI measurement of the CLI measurement resource using the determined receive beam associated with the indicated TCI state.

At 320, the UE 115-c may transmit, to the network entity 105-b, a message indicating the CLI measurement.

In some cases, the UE 115-c may receive, with the control signaling at 305, an indication that the TCI state is associated with a downlink channel for the UE 115-c. For example, the downlink channel may be the dedicated PDSCH and PUCCH for the UE 115-c. In some cases, receiving the indication that the TCI state is associated with the downlink channel for the UE 115-c includes receiving an indication of a unified TCI state.

In some cases, the UE 115-c may receive, from the network entity 105-b, a DCI message indicating the TCI state.

In some cases, the UE 115-c may receive, from the network entity 105-b, a control message indicating a set of TCI states associated with a set of CORESET pools. The UE 115-c may receive, with the control signaling at 305, an indication of a CORESET pool of the set of CORESET pools, where the TCI state is based on the indication of the CORESET pool. In some cases, the indication of the CORESET pool of the set of CORESET pools may include a CORESET pool identifier. In some cases, receiving the indication of the CORESET pool of the set of CORESET pools includes receiving the control signaling at 305 from a TRP associated with the CORESET pool, wherein each CORESET pool of the set of CORESET pools is associated with a respective TRP.

In some cases, the UE 115-c may receive, from the network entity 105-b, a control message indicating a second TCI state associated with a set of CLI measurement resources including the CLI measurement resource, where the CLI measurement resource is an aperiodic or a semi-periodic CLI measurement resource. The UE 115-c may receive, with the control signaling at 305, an indication to overwrite the second TCI state with the TCI state for the CLI measurement resource. In some cases, receiving the control signaling at 305 includes receiving a first control message indicating the CLI measurement resource and a first CORESET pool of the set of CORESET pools; receiving a second control message indicating the CLI measurement resource and a second CORESET pool of the set of CORESET pools. The UE 115-c may generate may a first CLI measurement of the CLI measurement resource using a first receive beam associated with a first TCI state associated with the first CORESET pool and may generate a second CLI measurement of the CLI measurement resource using a second receive beam associated with a second TCI state associated with the second CORESET pool. The message at 320 may indicate the first CLI measurement and the second CLI measurement.

In some cases, receiving the control signaling at 305 includes, receiving an RRC message configuring the CLI measurement resource and the TCI state, and the CLI measurement resource is a periodic CLI measurement resource.

In some cases, the CLI measurement resource is a layer one sounding reference signal resource or a layer one received signal strength indicator resource.

Figure 4:
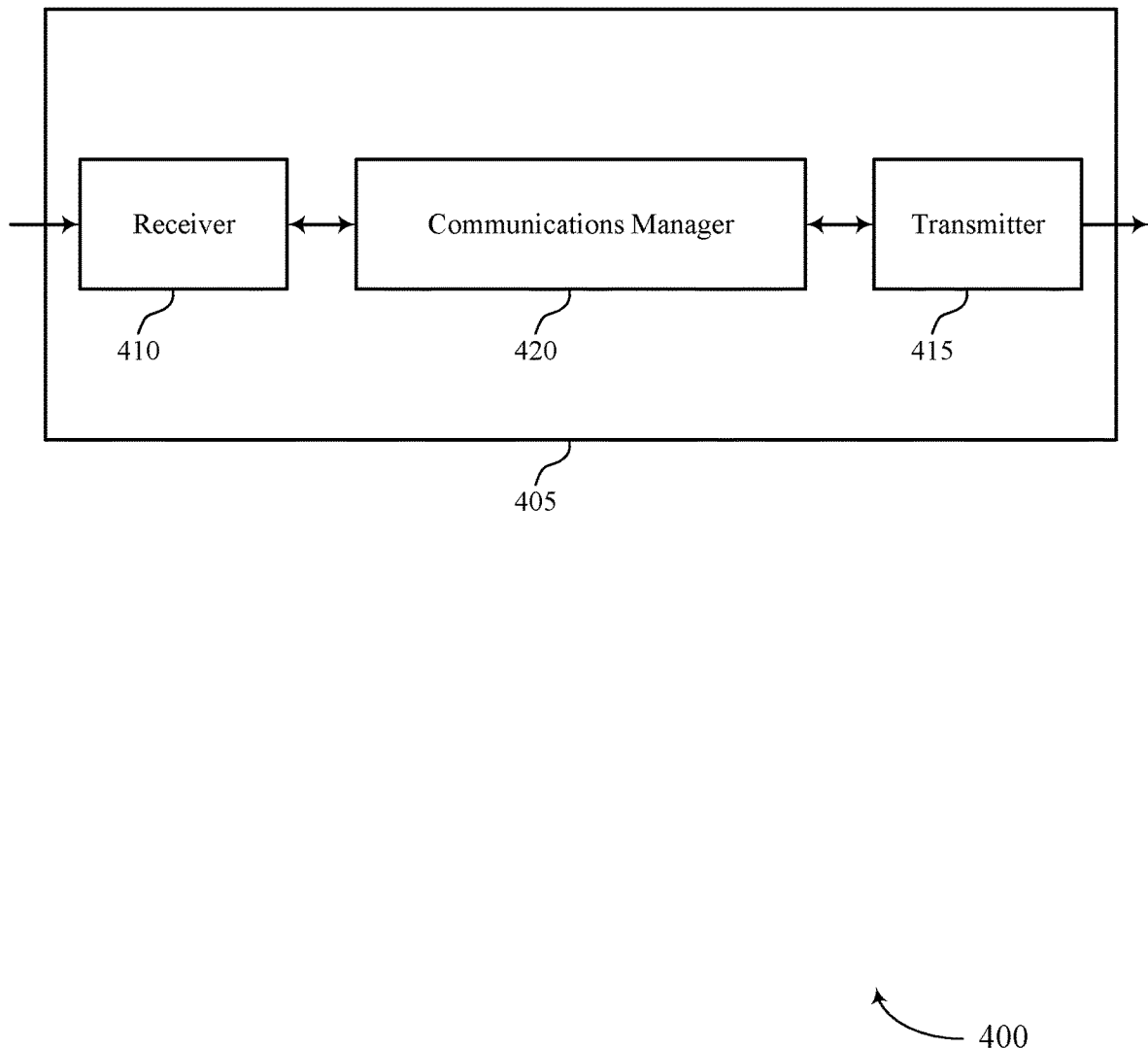
FIGS. 4 and 5 show block diagrams of devices that support unified TCI state indication for CLI measurement in accordance with one or more aspects of the present disclosure.

FIG. 4 shows a block diagram 400 of a device 405 that supports unified TCI state indication for CLI measurement in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to unified TCI state indication for CLI measurement). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to unified TCI state indication for CLI measurement). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of unified TCI state indication for CLI measurement as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 may be configured as or otherwise support a means for receiving, from a network entity, control signaling indicating a CLI measurement resource and a TCI state the UE is to apply for CLI measurement in the CLI measurement resource. The communications manager 420 may be configured as or otherwise support a means for generating a CLI measurement of the CLI measurement resource using a receive beam associated with the TCI state. The communications manager 420 may be configured as or otherwise support a means for transmitting, to the network entity, a message indicating the CLI measurement.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for more efficient utilization of communication resources by enabling enhanced CLI reporting.

Figure 5:
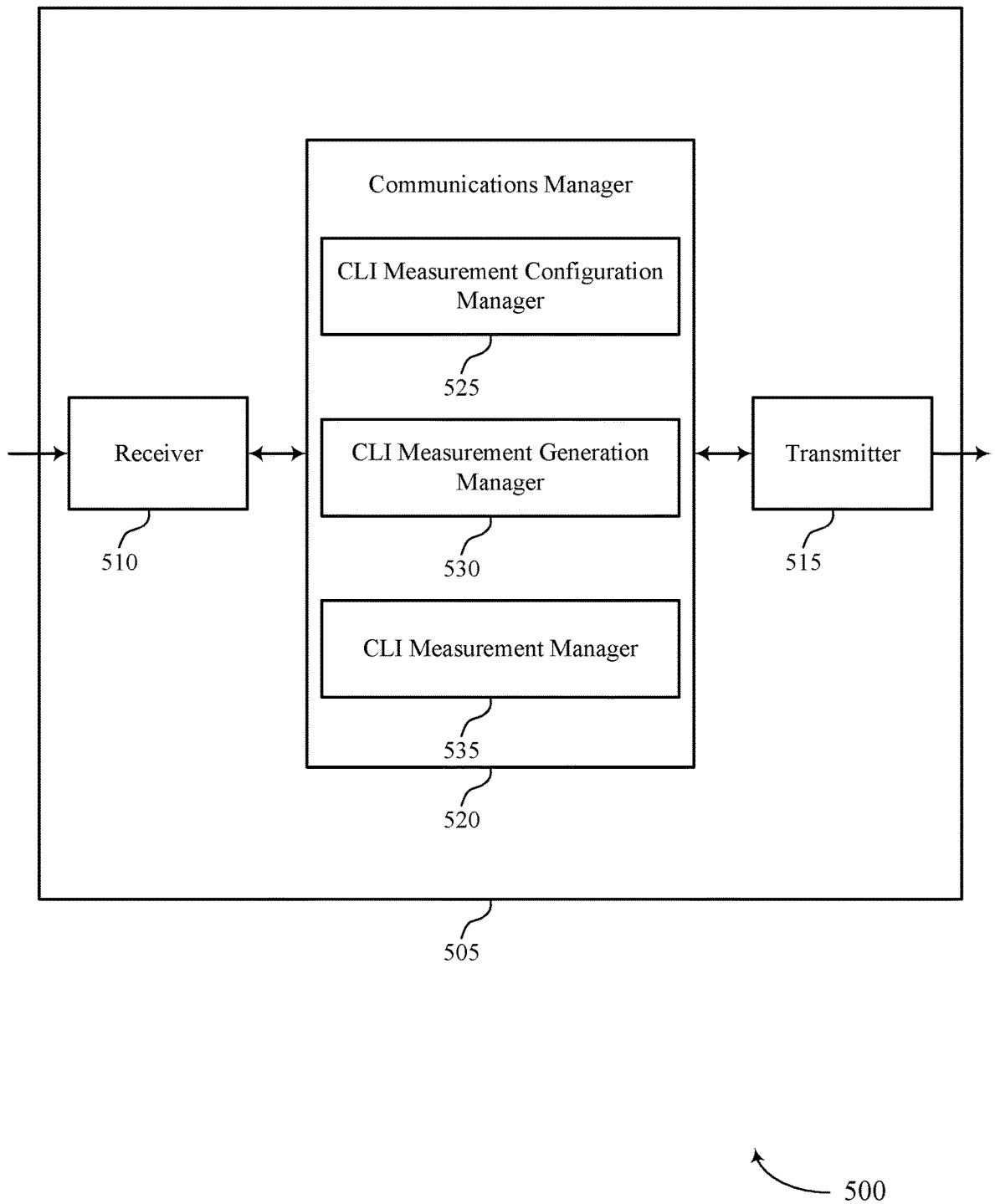

FIG. 5 shows a block diagram 500 of a device 505 that supports unified TCI state indication for CLI measurement in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to unified TCI state indication for CLI measurement). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to unified TCI state indication for CLI measurement). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of unified TCI state indication for CLI measurement as described herein. For example, the communications manager 520 may include a CLI measurement configuration manager 525, a CLI measurement generation manager 530, a CLI measurement manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The CLI measurement configuration manager 525 may be configured as or otherwise support a means for receiving, from a network entity, control signaling indicating a CLI measurement resource and a TCI state the UE is to apply for CLI measurement in the CLI measurement resource. The CLI measurement generation manager 530 may be configured as or otherwise support a means for generating a CLI measurement of the CLI measurement resource using a receive beam associated with the TCI state. The CLI measurement manager 535 may be configured as or otherwise support a means for transmitting, to the network entity, a message indicating the CLI measurement.

Figure 6:
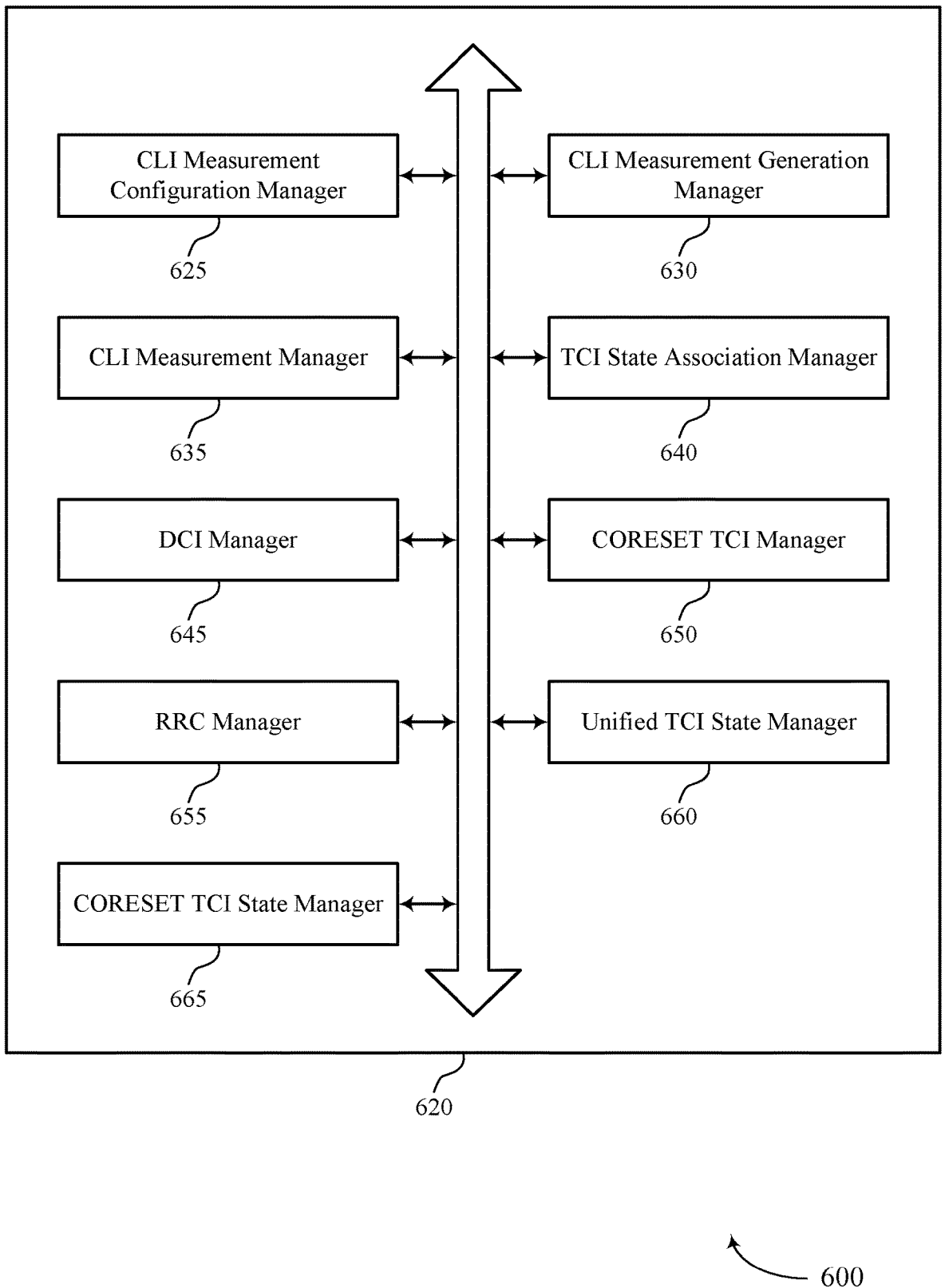
FIG. 6 shows a block diagram of a communications manager that supports unified TCI state indication for CLI measurement in accordance with one or more aspects of the present disclosure.

FIG. 6 shows a block diagram 600 of a communications manager 620 that supports unified TCI state indication for CLI measurement in accordance with one or more aspects of the present disclosure. The communications manager 620 may be an example of aspects of a communications manager 420, a communications manager 520, or both, as described herein. The communications manager 620, or various components thereof, may be an example of means for performing various aspects of unified TCI state indication for CLI measurement as described herein. For example, the communications manager 620 may include a CLI measurement configuration manager 625, a CLI measurement generation manager 630, a CLI measurement manager 635, a TCI state association manager 640, a DCI manager 645, a CORESET TCI manager 650, an RRC manager 655, a unified TCI state manager 660, a CORESET TCI state manager 665, or any combination thereof. Each of these components may communicate, directly or indirectly, with one another (e.g., via one or more buses).

The communications manager 620 may support wireless communications at a UE in accordance with examples as disclosed herein. The CLI measurement configuration manager 625 may be configured as or otherwise support a means for receiving, from a network entity, control signaling indicating a CLI measurement resource and a TCI state the UE is to apply for CLI measurement in the CLI measurement resource. The CLI measurement generation manager 630 may be configured as or otherwise support a means for generating a CLI measurement of the CLI measurement resource using a receive beam associated with the TCI state. The CLI measurement manager 635 may be configured as or otherwise support a means for transmitting, to the network entity, a message indicating the CLI measurement.

In some examples, to support receiving the control signaling, the TCI state association manager 640 may be configured as or otherwise support a means for receiving an indication that the TCI state is associated with a downlink channel for the UE.

In some examples, to support receiving the indication that the TCI state is associated with the downlink channel for the UE, the unified TCI state manager 660 may be configured as or otherwise support a means for receiving an indication of a unified TCI state.

In some examples, the DCI manager 645 may be configured as or otherwise support a means for receiving a downlink control information message indicating the TCI state.

In some examples, the CORESET TCI manager 650 may be configured as or otherwise support a means for receiving a control message indicating a set of TCI states associated with a set of CORESET pools, where each CORESET pool of the set of CORESET pools corresponds to one or more CORESETS. In some examples, the TCI state association manager 640 may be configured as or otherwise support a means for receiving, with the control signaling, an indication of a CORESET pool of the set of CORESET pool, where the TCI state is based on the indication of the CORESET.

In some examples, to support receiving the indication of the CORESET pool of the set of CORESET pools, the CORESET TCI state manager 665 may be configured as or otherwise support a means for receiving the control signaling from a TRP associated with the CORESET pool, where each CORESET pool of the set of CORESET pools is associated with a respective TRP.

In some examples, to support receiving the control signaling, the TCI state association manager 640 may be configured as or otherwise support a means for receiving a first control message indicating the CLI measurement resource and a first CORESET pool of the set of CORESET pools and a second control message indicating the CLI measurement resource and a second CORESET pool of the set of CORESET pools. The CLI measurement generation manager 630 may be configured as or otherwise support a means for generating a first CLI measurement of the CLI measurement resource using a first receive beam associated with a first TCI state associated with the first CORESET pool and generating a second CLI measurement of the CLI measurement resource using a second receive beam associated with a second TCI state associated with the second CORESET pool, and the message indicates the first CLI measurement and the second CLI measurement.

In some examples, the CLI measurement configuration manager 625 may be configured as or otherwise support a means for receiving a control message indicating a second TCI state associated with a set of CLI measurement resources including the CLI measurement resource, where the CLI measurement resource includes an aperiodic or a semi-periodic CLI measurement resource. In some examples, the CLI measurement configuration manager 625 may be configured as or otherwise support a means for receiving, with the control signaling, an indication to overwrite the second TCI state with the TCI state for the CLI measurement resource.

In some examples, to support receiving the control signaling, the RRC manager 655 may be configured as or otherwise support a means for receiving a radio resource control message configuring the CLI measurement resource and the TCI state, where the CLI measurement resource includes a periodic CLI measurement resource.

In some examples, the CLI measurement resource includes a layer one sounding reference signal resource or a layer one received signal strength indicator resource.

Figure 7:
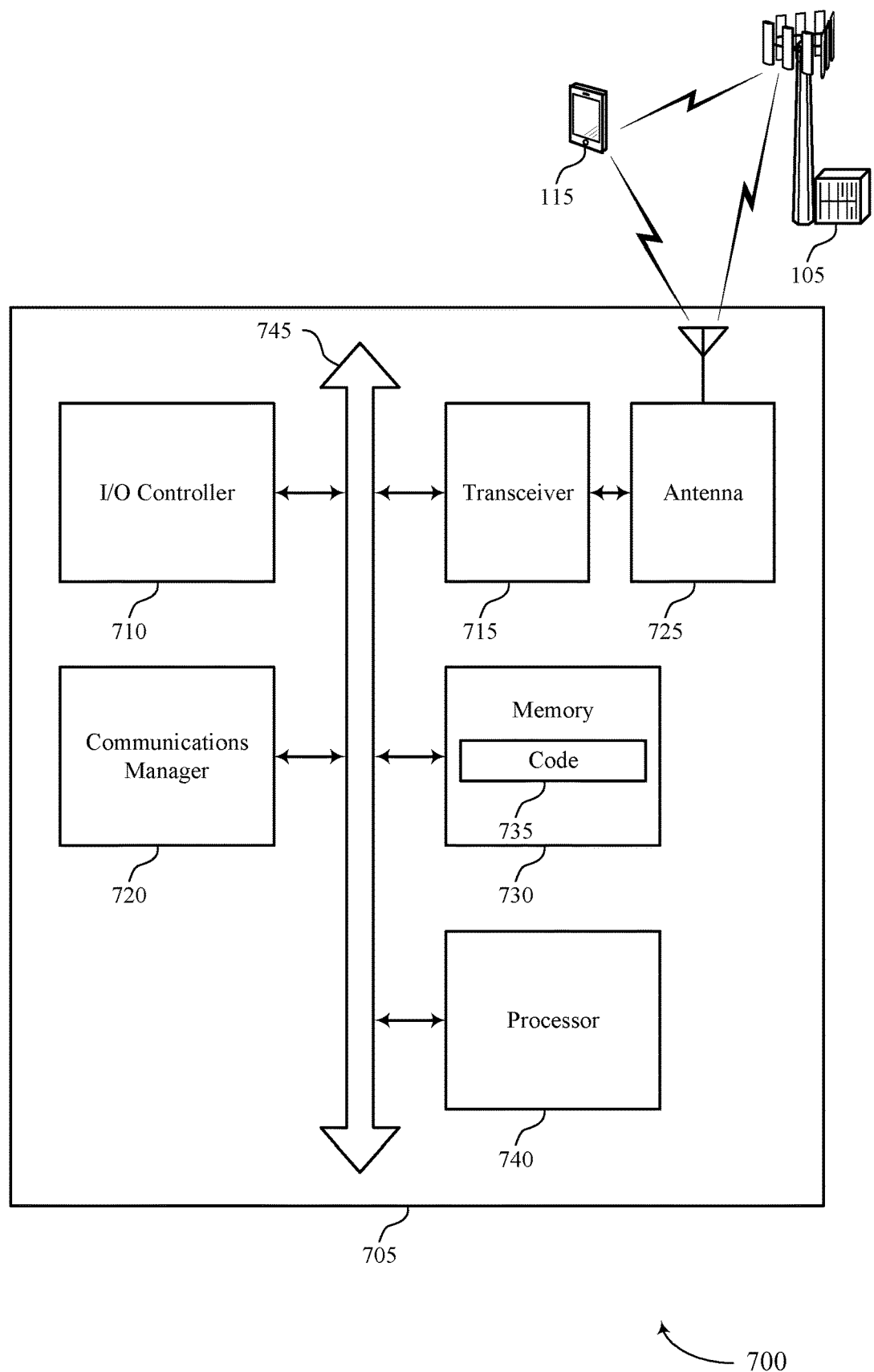
FIG. 7 shows a diagram of a system including a device that supports unified TCI state indication for CLI measurement in accordance with one or more aspects of the present disclosure.

FIG. 7 shows a diagram of a system 700 including a device 705 that supports unified TCI state indication for CLI measurement in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting unified TCI state indication for CLI measurement). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a network entity, control signaling indicating a CLI measurement resource and a TCI state the UE is to apply for CLI measurement in the CLI measurement resource. The communications manager 720 may be configured as or otherwise support a means for generating a CLI measurement of the CLI measurement resource using a receive beam associated with the TCI state. The communications manager 720 may be configured as or otherwise support a means for transmitting, to the network entity, a message indicating the CLI measurement.

By including or configuring the communications manager 720 in accordance with examples as described herein, the device 705 may support techniques for improved communication reliability and more efficient utilization of communication resources by enabling enhanced CLI reporting.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of unified TCI state indication for CLI measurement as described herein, or the processor 740 and the memory 730 may be otherwise configured to perform or support such operations.

Figure 8:
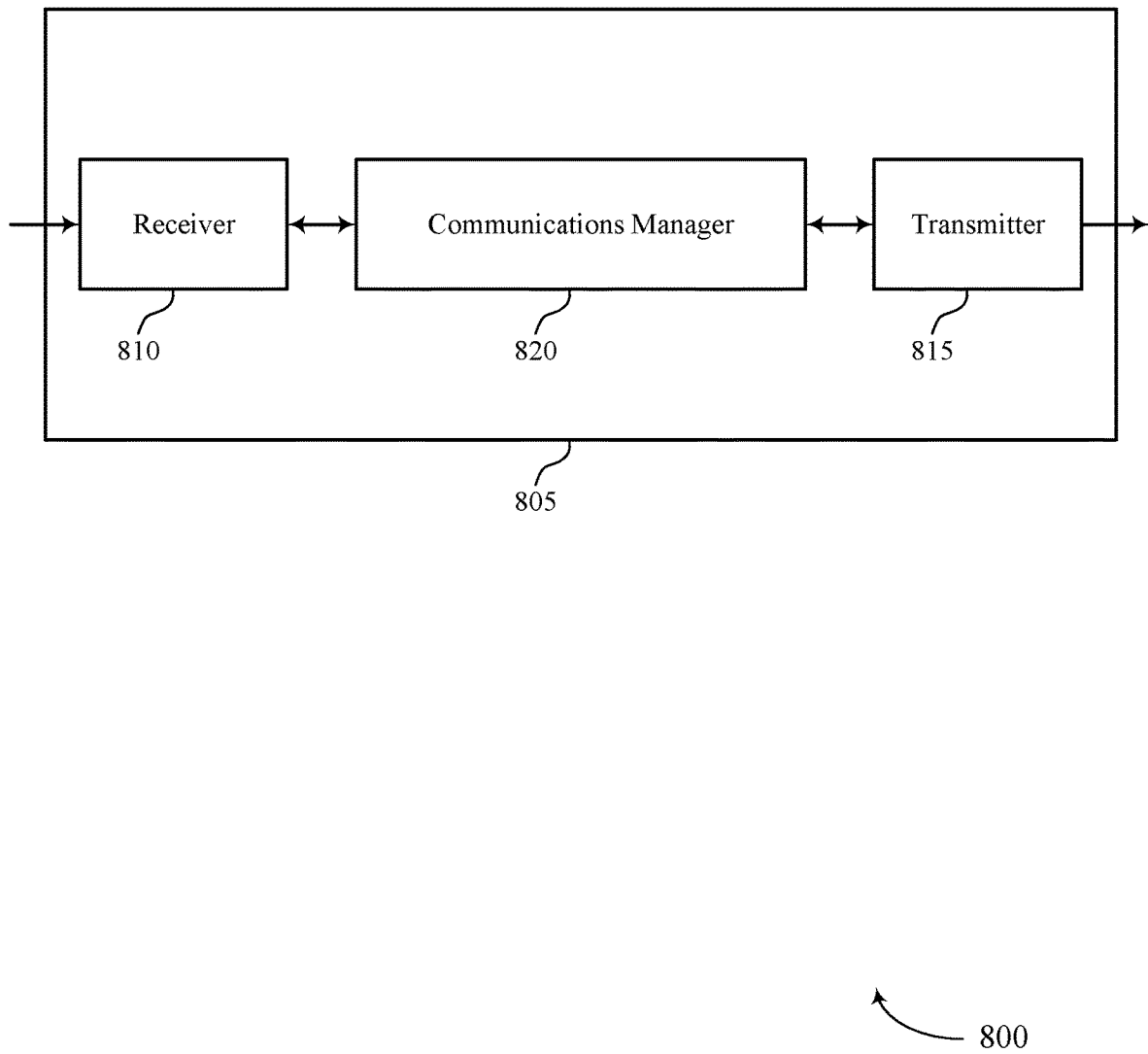
FIGS. 8 and 9 show block diagrams of devices that support unified TCI state indication for CLI measurement in accordance with one or more aspects of the present disclosure.

FIG. 8 shows a block diagram 800 of a device 805 that supports unified TCI state indication for CLI measurement in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of unified TCI state indication for CLI measurement as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 may be configured as or otherwise support a means for transmitting, to a UE, control signaling indicating a CLI measurement resource and a TCI state to apply for CLI measurement in the CLI measurement resource. The communications manager 820 may be configured as or otherwise support a means for receiving, from the UE, a message indicating a CLI measurement of the CLI measurement resource measured at the UE using a beam associated with the TCI state.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for more efficient utilization of communication resources by enabling enhanced CLI reporting.

Figure 9:
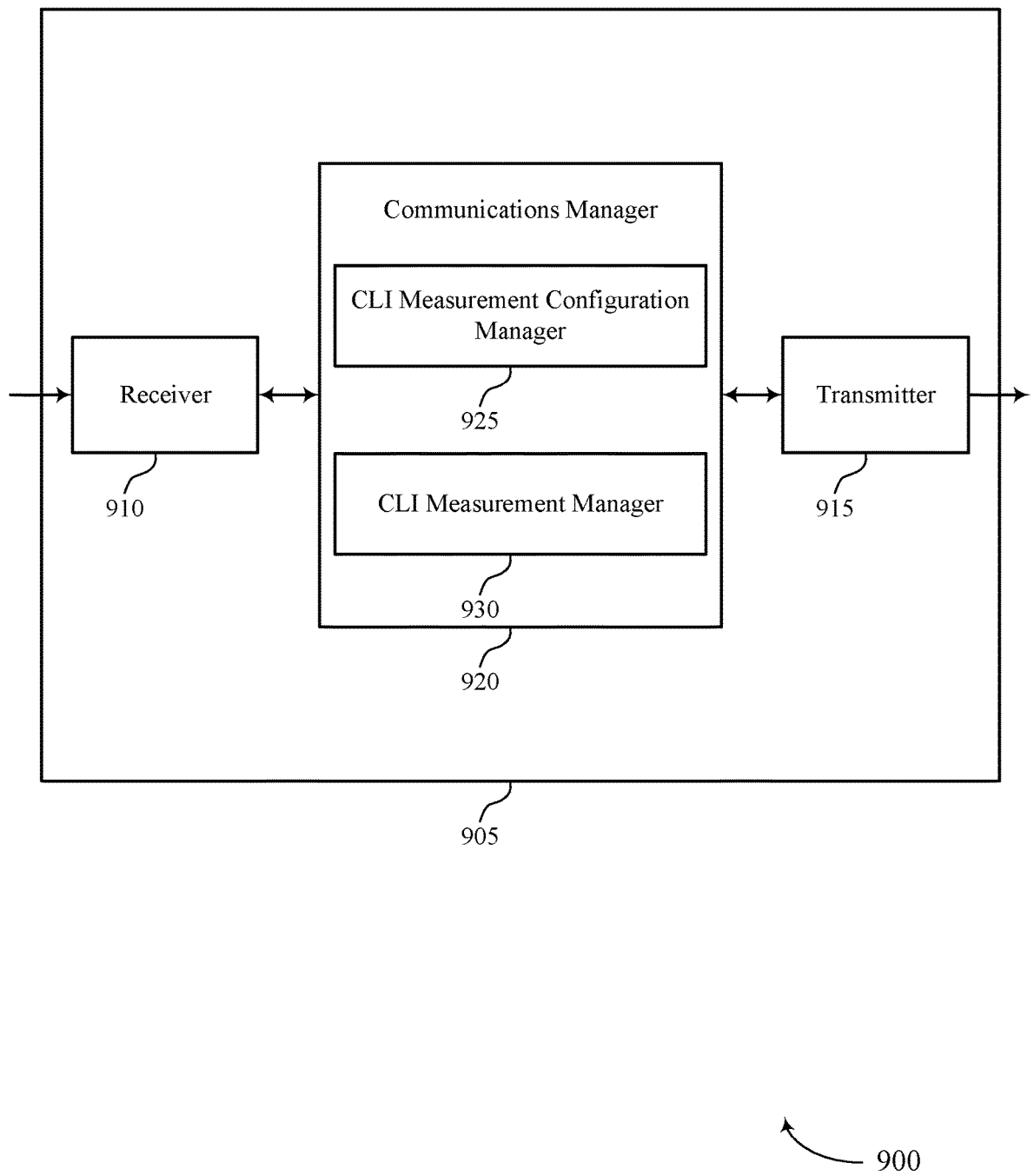

FIG. 9 shows a block diagram 900 of a device 905 that supports unified TCI state indication for CLI measurement in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of unified TCI state indication for CLI measurement as described herein. For example, the communications manager 920 may include a CLI measurement configuration manager 925 a CLI measurement manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The CLI measurement configuration manager 925 may be configured as or otherwise support a means for transmitting, to a UE, control signaling indicating a CLI measurement resource and a TCI state to apply for CLI measurement in the CLI measurement resource. The CLI measurement manager 930 may be configured as or otherwise support a means for receiving, from the UE, a message indicating a CLI measurement of the CLI measurement resource measured at the UE using a beam associated with the TCI state.

Figure 10:
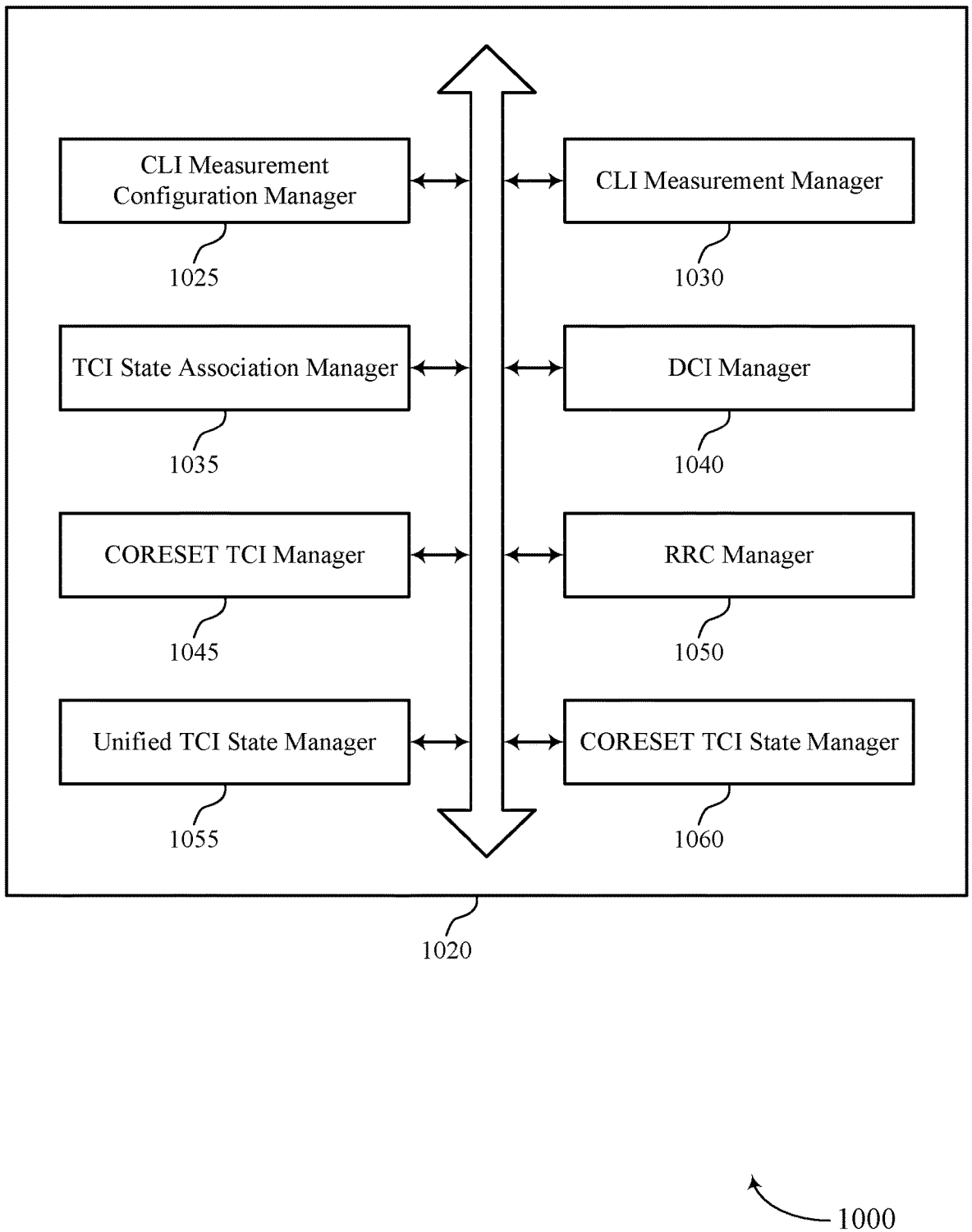
FIG. 10 shows a block diagram of a communications manager that supports unified TCI state indication for CLI measurement in accordance with one or more aspects of the present disclosure.

FIG. 10 shows a block diagram 1000 of a communications manager 1020 that supports unified TCI state indication for CLI measurement in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of unified TCI state indication for CLI measurement as described herein. For example, the communications manager 1020 may include a CLI measurement configuration manager 1025, a CLI measurement manager 1030, a TCI state association manager 1035, a DCI manager 1040, a CORESET TCI manager 1045, an RRC manager 1050, a unified TCI state manager 1055, a CORESET TCI state manager 1060, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The CLI measurement configuration manager 1025 may be configured as or otherwise support a means for transmitting, to a UE, control signaling indicating a CLI measurement resource and a TCI state to apply for CLI measurement in the CLI measurement resource. The CLI measurement manager 1030 may be configured as or otherwise support a means for receiving, from the UE, a message indicating a CLI measurement of the CLI measurement resource measured at the UE using a beam associated with the TCI state.

In some examples, to support transmitting the control signaling, the TCI state association manager 1035 may be configured as or otherwise support a means for transmitting an indication that the TCI state is associated with a downlink channel for the UE.

In some examples, to support transmitting the indication that the TCI state is associated with the downlink channel for the UE, the unified TCI state manager 1055 may be configured as or otherwise support a means for transmitting an indication of a unified TCI state.

In some examples, the DCI manager 1040 may be configured as or otherwise support a means for transmitting, to the UE, a downlink control information message indicating the TCI state.

In some examples, the CORESET TCI manager 1045 may be configured as or otherwise support a means for transmitting, to the UE, a control message indicating a set of TCI states associated with a set of CORESETs pools, where each CORESET pool of the set of CORESET pools corresponds to one or more CORESETS. In some examples, the TCI state association manager 1035 may be configured as or otherwise support a means for transmitting, with the control signaling, an indication of a CORESET pool of the set of CORESET pools, where the TCI state is based on the indication of the CORESET pool.

In some examples, to support transmitting the indication of the CORESET pool of the set of CORESET pools, the CORESET TCI state manager 1060 may be configured as or otherwise support a means for transmitting the control signaling from a TRP associated with the CORESET pool, where each CORESET pool of the set of CORESET pools is associated with a respective TRP.

In some examples, to support transmitting the control signaling, the TCI state association manager 1035 may be configured as or otherwise support a means for transmitting a first control message indicating the CLI measurement resource and a first CORESET pool of the set of CORESET pools and a second control message indicating the CLI measurement resource and a second CORESET pool of the set of CORESET pools, and the message indicates a first CLI measurement measured at the UE using a first beam associated with a first TCI state associated with the first CORESET pool and a second CLI measurement measured at the UE using a second beam associated with a second TCI state associated with the second CORESET pool.

In some examples, the CLI measurement configuration manager 1025 may be configured as or otherwise support a means for transmitting, to the UE, a control message indicating a second TCI state associated with a set of CLI measurement resources including the CLI measurement resource, where the CLI measurement resource includes an aperiodic or a semi-periodic CLI measurement resource. In some examples, the CLI measurement configuration manager 1025 may be configured as or otherwise support a means for transmitting, with the control signaling, an indication to overwrite the second TCI state with the TCI state for the CLI measurement resource.

In some examples, to support transmitting the control signaling, the RRC manager 1050 may be configured as or otherwise support a means for transmitting a radio resource control message configuring the CLI measurement resource and the TCI state, where the CLI measurement resource includes a periodic CLI measurement resource.

In some examples, the CLI measurement resource includes a layer one sounding reference signal resource or a layer one received signal strength indicator resource.

Figure 11:
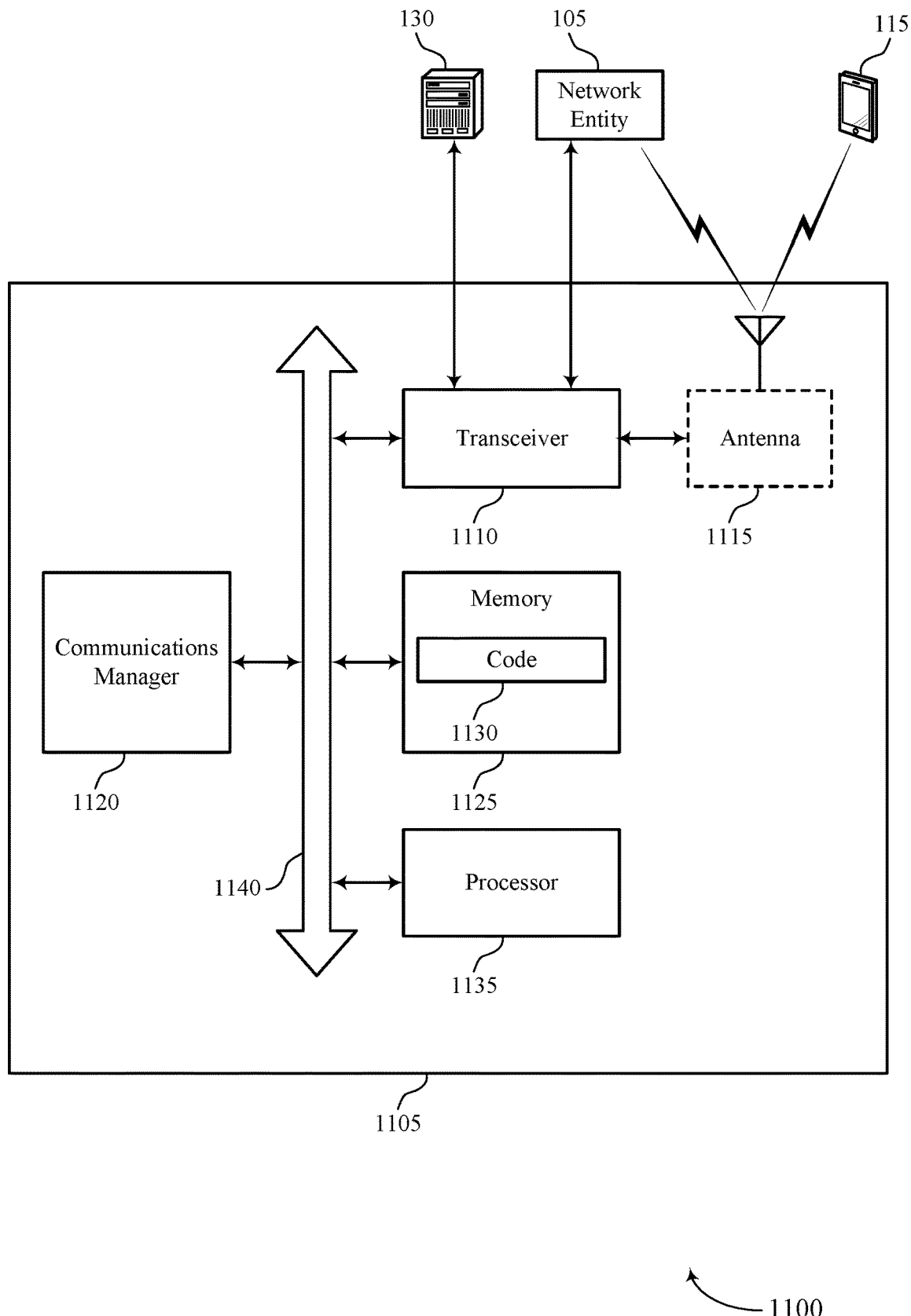
FIG. 11 shows a diagram of a system including a device that supports unified TCI state indication for CLI measurement in accordance with one or more aspects of the present disclosure.

FIG. 11 shows a diagram of a system 1100 including a device 1105 that supports unified TCI state indication for CLI measurement in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting unified TCI state indication for CLI measurement). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

For example, the communications manager 1120 may be configured as or otherwise support a means for transmitting, to a UE, control signaling indicating a CLI measurement resource and a TCI state to apply for CLI measurement in the CLI measurement resource. The communications manager 1120 may be configured as or otherwise support a means for receiving, from the UE, a message indicating a CLI measurement of the CLI measurement resource measured at the UE using a beam associated with the TCI state.

By including or configuring the communications manager 1120 in accordance with examples as described herein, the device 1105 may support techniques for improved communication reliability and more efficient utilization of communication resources by enabling enhanced CLI reporting.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of unified TCI state indication for CLI measurement as described herein, or the processor 1135 and the memory 1125 may be otherwise configured to perform or support such operations.

Figure 12:
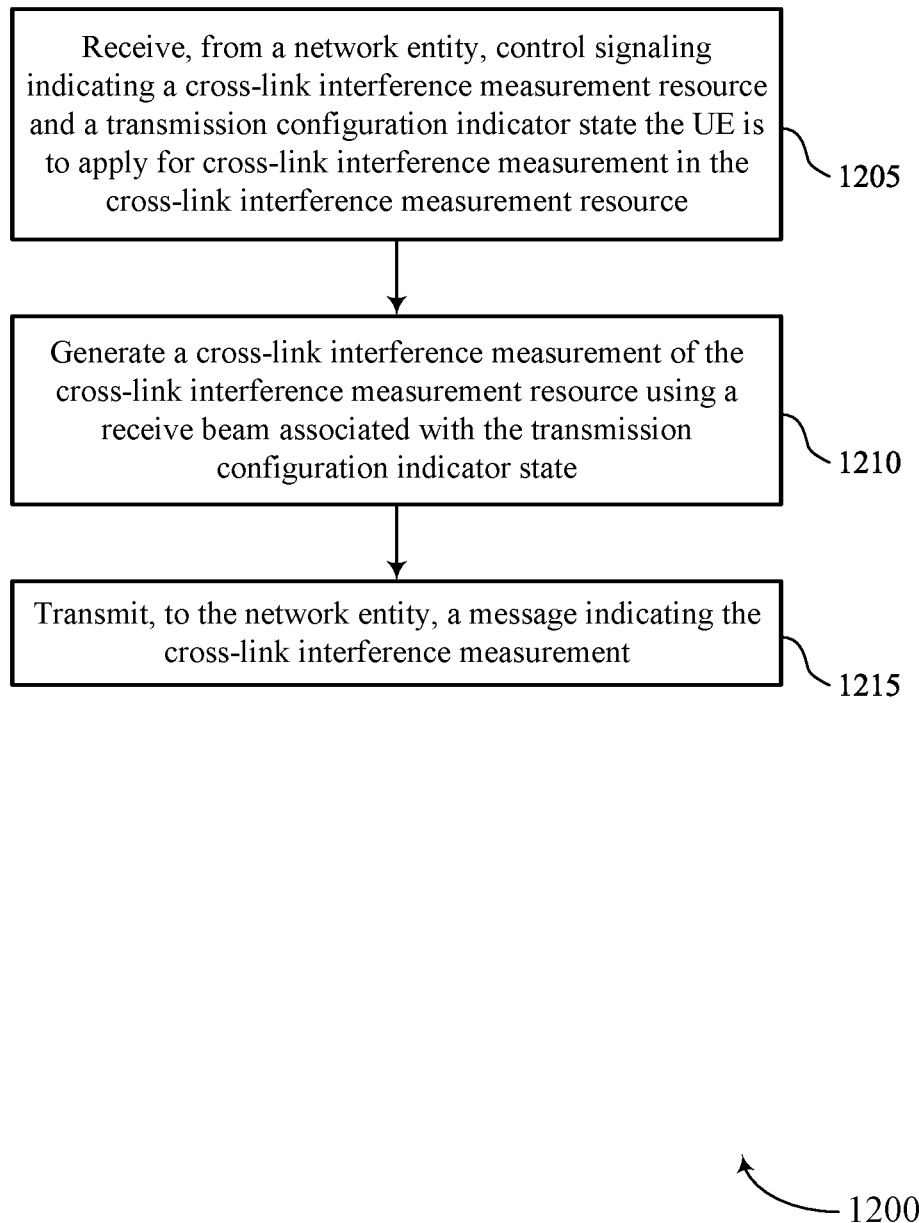
FIGS. 12 through 17 show flowcharts illustrating methods that support unified TCI state indication for CLI measurement in accordance with one or more aspects of the present disclosure.

FIG. 12 shows a flowchart illustrating a method 1200 that supports unified TCI state indication for CLI measurement in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a network entity, control signaling indicating a CLI measurement resource and a TCI state the UE is to apply for CLI measurement in the CLI measurement resource. The operations of 1205 may be performed in accordance with examples as disclosed herein. In some examples, aspects of the operations of 1205 may be performed by a CLI measurement configuration manager 625 as described with reference to FIG. 6.

At 1210, the method may include generating a CLI measurement of the CLI measurement resource using a receive beam associated with the TCI state. The operations of 1210 may be performed in accordance with examples as disclosed herein. In some examples, aspects of the operations of 1210 may be performed by a CLI measurement generation manager 630 as described with reference to FIG. 6.

At 1215, the method may include transmitting, to the network entity, a message indicating the CLI measurement. The operations of 1215 may be performed in accordance with examples as disclosed herein. In some examples, aspects of the operations of 1215 may be performed by a CLI measurement manager 635 as described with reference to FIG. 6.

Figure 13:
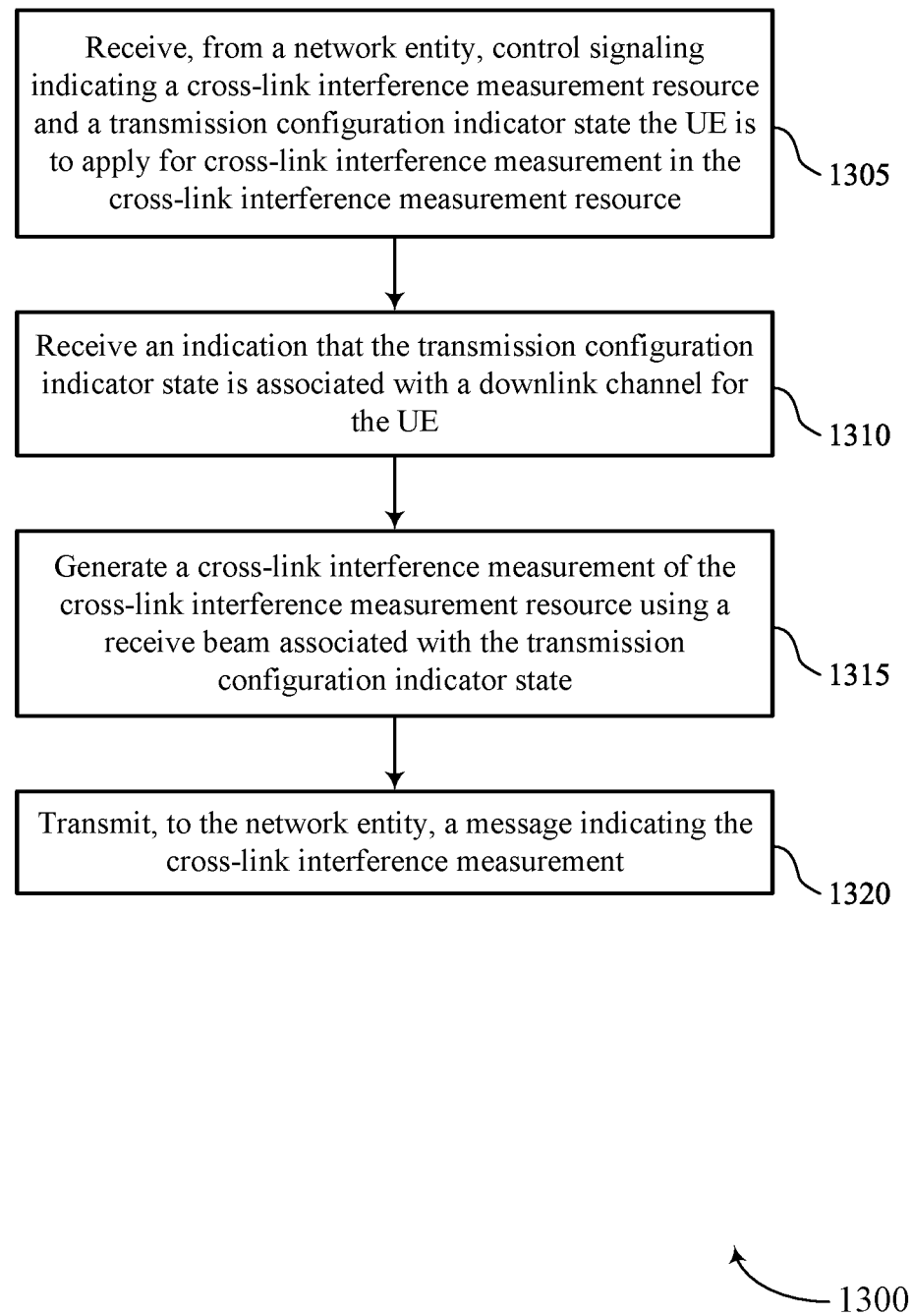

FIG. 13 shows a flowchart illustrating a method 1300 that supports unified TCI state indication for CLI measurement in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, control signaling indicating a CLI measurement resource and a TCI state the UE is to apply for CLI measurement in the CLI measurement resource. The operations of 1305 may be performed in accordance with examples as disclosed herein. In some examples, aspects of the operations of 1305 may be performed by a CLI measurement configuration manager 625 as described with reference to FIG. 6.

At 1310, the method may include receiving an indication that the TCI state is associated with a downlink channel for the UE. The operations of 1310 may be performed in accordance with examples as disclosed herein. In some examples, aspects of the operations of 1310 may be performed by a TCI state association manager 640 as described with reference to FIG. 6.

At 1315, the method may include generating a CLI measurement of the CLI measurement resource using a receive beam associated with the TCI state. The operations of 1315 may be performed in accordance with examples as disclosed herein. In some examples, aspects of the operations of 1315 may be performed by a CLI measurement generation manager 630 as described with reference to FIG. 6.

At 1320, the method may include transmitting, to the network entity, a message indicating the CLI measurement. The operations of 1320 may be performed in accordance with examples as disclosed herein. In some examples, aspects of the operations of 1320 may be performed by a CLI measurement manager 635 as described with reference to FIG. 6.

Figure 14:
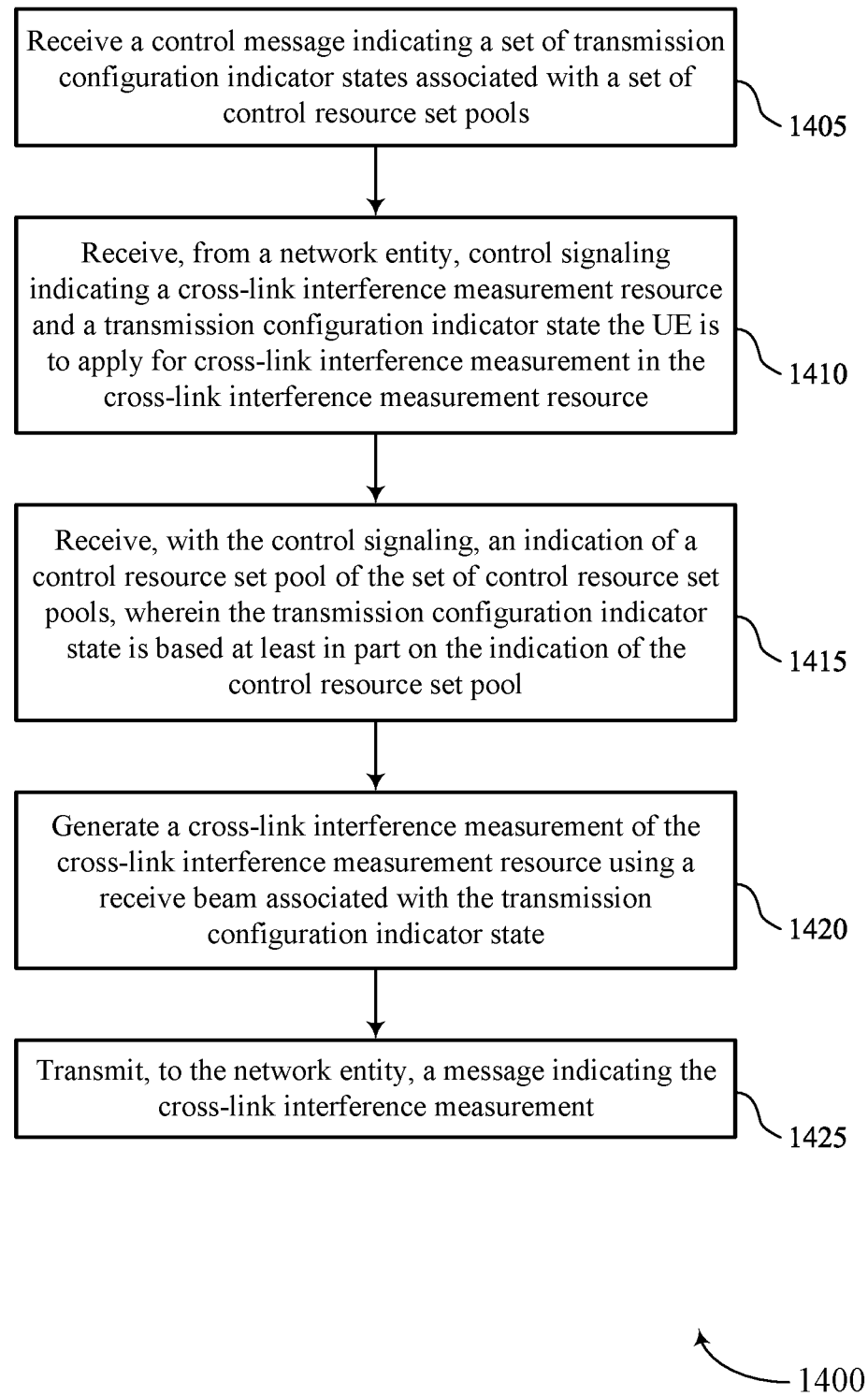

FIG. 14 shows a flowchart illustrating a method 1400 that supports unified TCI state indication for CLI measurement in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving a control message indicating a set of TCI states associated with a set of CORESET pools. The operations of 1405 may be performed in accordance with examples as disclosed herein. In some examples, aspects of the operations of 1405 may be performed by a CORESET TCI manager 650 as described with reference to FIG. 6.

At 1410, the method may include receiving, from a network entity, control signaling indicating a CLI measurement resource and a TCI state the UE is to apply for CLI measurement in the CLI measurement resource. The operations of 1410 may be performed in accordance with examples as disclosed herein. In some examples, aspects of the operations of 1410 may be performed by a CLI measurement configuration manager 625 as described with reference to FIG. 6.

At 1415, the method may include receiving, with the control signaling, an indication of a CORESET pool of the set of CORESET pools, where the TCI state is based on the indication of the CORESET pool. The operations of 1415 may be performed in accordance with examples as disclosed herein. In some examples, aspects of the operations of 1415 may be performed by a TCI state association manager 640 as described with reference to FIG. 6.

At 1420, the method may include generating a CLI measurement of the CLI measurement resource using a receive beam associated with the TCI state. The operations of 1420 may be performed in accordance with examples as disclosed herein. In some examples, aspects of the operations of 1420 may be performed by a CLI measurement generation manager 630 as described with reference to FIG. 6.

At 1425, the method may include transmitting, to the network entity, a message indicating the CLI measurement. The operations of 1425 may be performed in accordance with examples as disclosed herein. In some examples, aspects of the operations of 1425 may be performed by a CLI measurement manager 635 as described with reference to FIG. 6.

Figure 15:
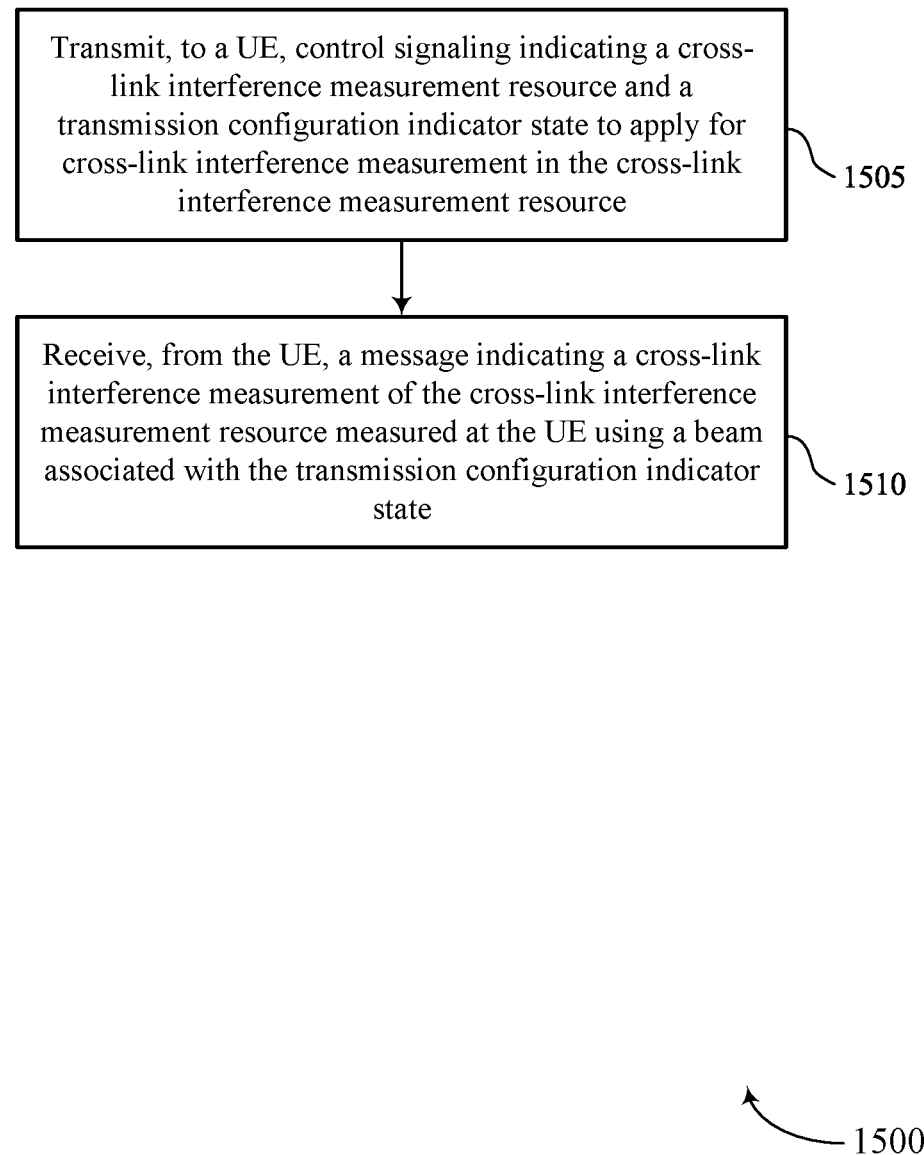

FIG. 15 shows a flowchart illustrating a method 1500 that supports unified TCI state indication for CLI measurement in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, control signaling indicating a CLI measurement resource and a TCI state to apply for CLI measurement in the CLI measurement resource. The operations of 1505 may be performed in accordance with examples as disclosed herein. In some examples, aspects of the operations of 1505 may be performed by a CLI measurement configuration manager 1025 as described with reference to FIG. 10.

At 1510, the method may include receiving, from the UE, a message indicating a CLI measurement of the CLI measurement resource measured at the UE using a beam associated with the TCI state. The operations of 1510 may be performed in accordance with examples as disclosed herein. In some examples, aspects of the operations of 1510 may be performed by a CLI measurement manager 1030 as described with reference to FIG. 10.

Figure 16:
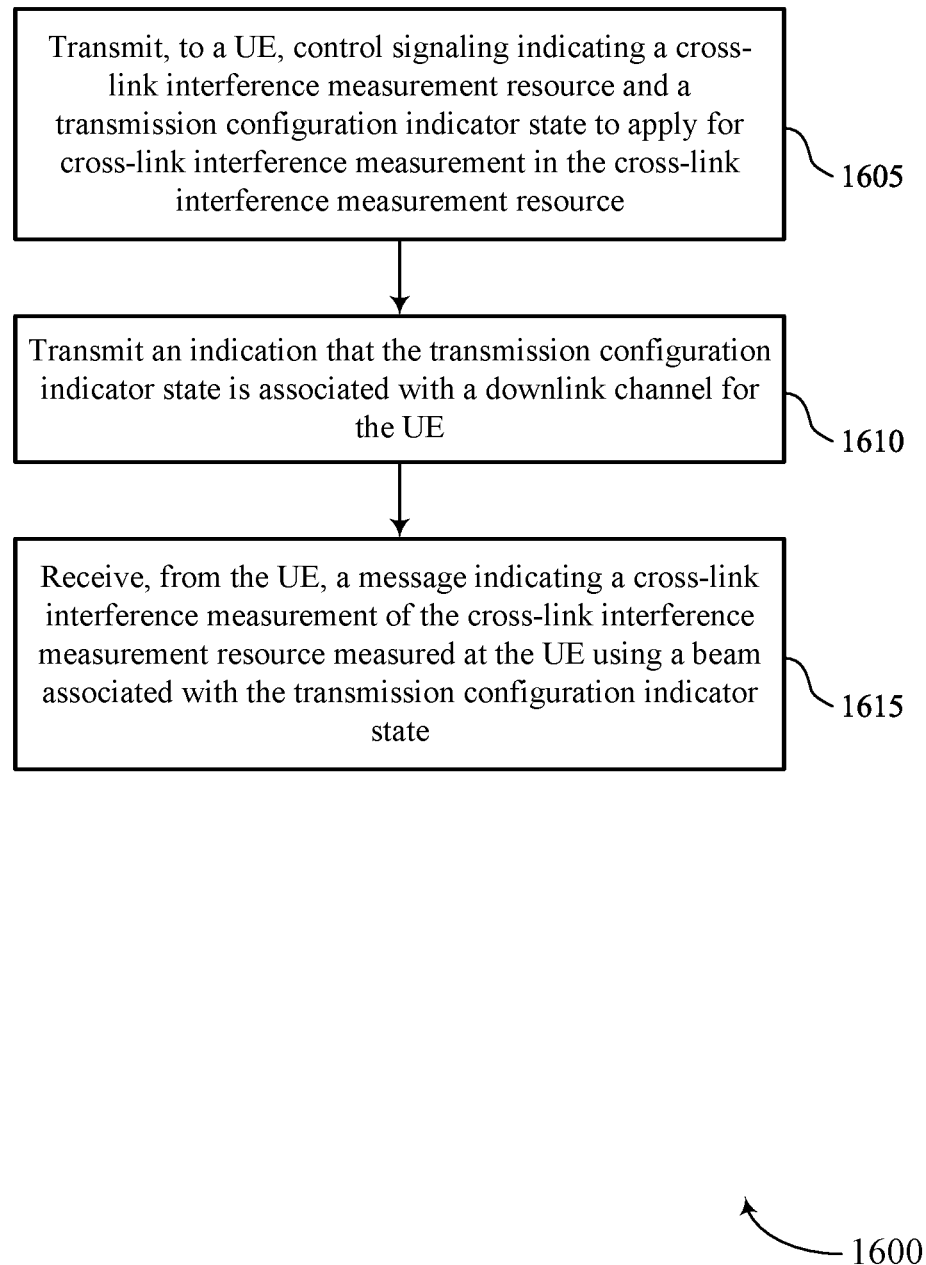

FIG. 16 shows a flowchart illustrating a method 1600 that supports unified TCI state indication for CLI measurement in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, control signaling indicating a CLI measurement resource and a TCI state to apply for CLI measurement in the CLI measurement resource. The operations of 1605 may be performed in accordance with examples as disclosed herein. In some examples, aspects of the operations of 1605 may be performed by a CLI measurement configuration manager 1025 as described with reference to FIG. 10.

At 1610, the method may include transmitting an indication that the TCI state is associated with a downlink channel for the UE. The operations of 1610 may be performed in accordance with examples as disclosed herein. In some examples, aspects of the operations of 1610 may be performed by a TCI state association manager 1035 as described with reference to FIG. 10.

At 1615, the method may include receiving, from the UE, a message indicating a CLI measurement of the CLI measurement resource measured at the UE using a beam associated with the TCI state. The operations of 1615 may be performed in accordance with examples as disclosed herein. In some examples, aspects of the operations of 1615 may be performed by a CLI measurement manager 1030 as described with reference to FIG. 10.

Figure 17:
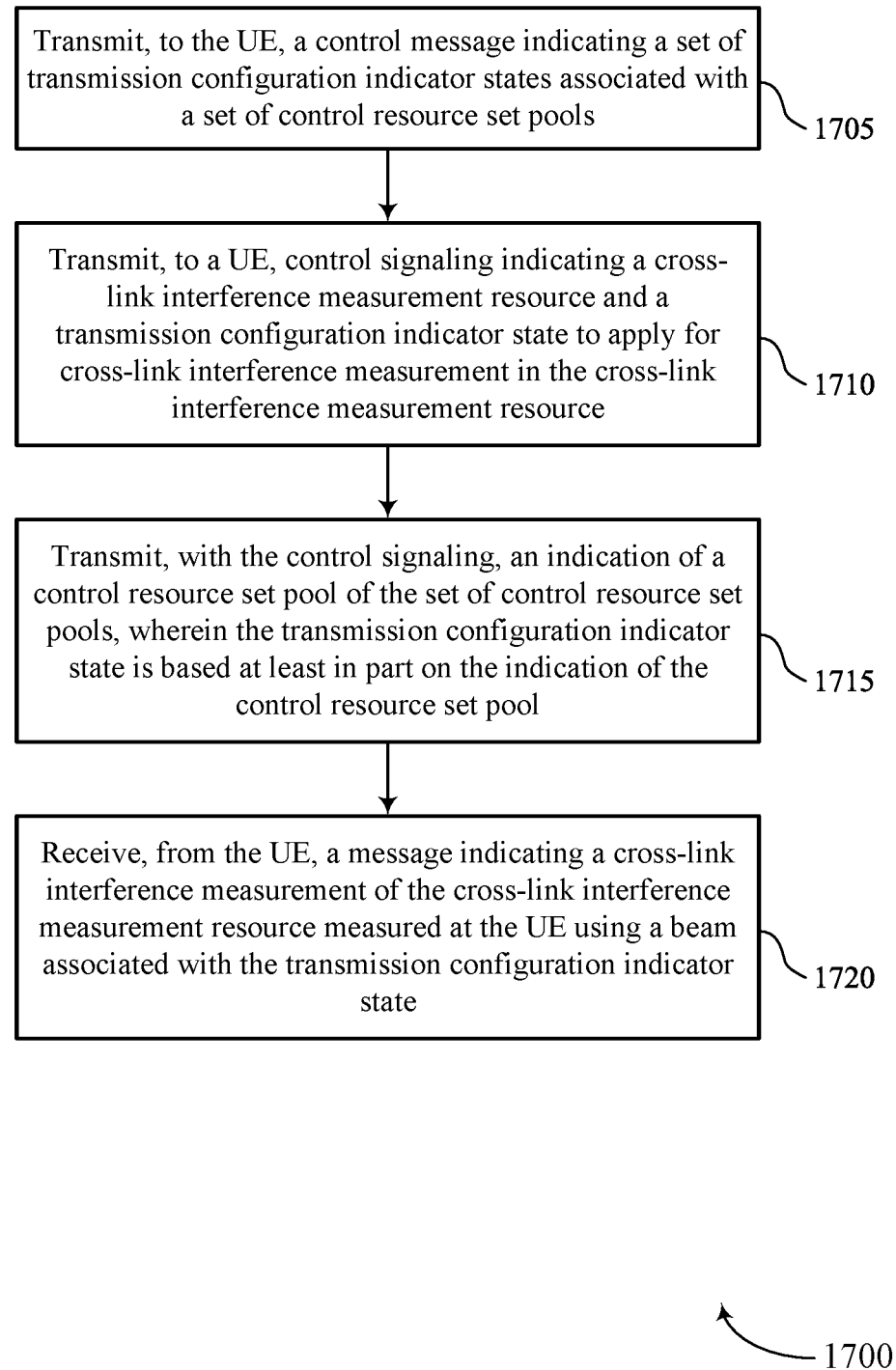

FIG. 17 shows a flowchart illustrating a method 1700 that supports unified TCI state indication for CLI measurement in accordance with one or more aspects of the present disclosure. The operations of the method 1700 may be implemented by a network entity or its components as described herein. For example, the operations of the method 1700 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to the UE, a control message indicating a set of TCI states associated with a set of CORESET pools. The operations of 1705 may be performed in accordance with examples as disclosed herein. In some examples, aspects of the operations of 1705 may be performed by a CORESET TCI manager 1045 as described with reference to FIG. 10.

At 1710, the method may include transmitting, to a UE, control signaling indicating a CLI measurement resource and a TCI state to apply for CLI measurement in the CLI measurement resource. The operations of 1710 may be performed in accordance with examples as disclosed herein. In some examples, aspects of the operations of 1710 may be performed by a CLI measurement configuration manager 1025 as described with reference to FIG. 10.

At 1715, the method may include transmitting, with the control signaling, an indication of a CORESET pool of the set of CORESET pools, where the TCI state is based on the indication of the CORESET pool. The operations of 1715 may be performed in accordance with examples as disclosed herein. In some examples, aspects of the operations of 1715 may be performed by a TCI state association manager 1035 as described with reference to FIG. 10.

At 1720, the method may include receiving, from the UE, a message indicating a CLI measurement of the CLI measurement resource measured at the UE using a beam associated with the TCI state. The operations of 1720 may be performed in accordance with examples as disclosed herein. In some examples, aspects of the operations of 1720 may be performed by a CLI measurement manager 1030 as described with reference to FIG. 10.

The following provides an overview of aspects of the present disclosure:

Aspect 1: A method for wireless communications at a UE, comprising: receiving, from a network entity, control signaling indicating a CLI measurement resource and a TCI state the UE is to apply for CLI measurement in the CLI measurement resource; generating a CLI measurement of the CLI measurement resource using a receive beam associated with the TCI state; and transmitting, to the network entity, a message indicating the CLI measurement.

Aspect 2: The method of aspect 1, wherein receiving the control signaling comprises: receiving an indication that the TCI state is associated with a downlink channel for the UE.

Aspect 3: The method of aspect 2, wherein receiving the indication that the TCI state is associated with the downlink channel for the UE comprises: receiving an indication of a unified TCI state.

Aspect 4: The method of any of aspects 1 through 3, further comprising: receiving a downlink control information message indicating the TCI state.

Aspect 5: The method of any of aspects 1 through 4, further comprising: receiving a control message indicating a set of TCI states associated with a set of CORESET pools, wherein each CORESET pool of the set of CORESET pools corresponds to one or more CORESETs; and receiving, with the control signaling, an indication of a CORESET pool of the set of CORESET pools, wherein the TCI state is based at least in part on the indication of the CORESET pool.

Aspect 6: The method of aspect 5, wherein receiving the indication of the CORESET pool of the set of CORESET pools comprises: receiving the control signaling from a TRP associated with the CORESET pool, wherein each CORESET pool of the set of CORESET pools is associated with a respective TRP.

Aspect 7: The method of any of aspects 5 through 6, wherein receiving the control signaling comprises: receiving a first control message indicating the CLI measurement resource and a first CORESET pool of the set of CORESET pools; and receiving a second control message indicating the CLI measurement resource and a second CORESET pool of the set of CORESET pools; and further comprising: generating a first CLI measurement of the CLI measurement resource using a first receive beam associated with a first TCI state associated with the first CORESET pool and generating a second CLI measurement of the CLI measurement resource using a second receive beam associated with a second TCI state associated with the second CORESET pool, wherein the message indicates the first CLI measurement and the second CLI measurement.

Aspect 8: The method of any of aspects 1 through 7, further comprising: receiving a control message indicating a second TCI state associated with a set of CLI measurement resources comprising the CLI measurement resource, wherein the CLI measurement resource comprises an aperiodic or a semi-periodic CLI measurement resource; and receiving, with the control signaling, an indication to overwrite the second TCI state with the TCI state for the CLI measurement resource.

Aspect 9: The method of any of aspects 1 through 8, wherein receiving the control signaling comprises: receiving a radio resource control message configuring the CLI measurement resource and the TCI state, wherein the CLI measurement resource comprises a periodic CLI measurement resource.

Aspect 10: The method of any of aspects 1 through 9, wherein the CLI measurement resource comprises a layer one sounding reference signal resource or a layer one received signal strength indicator resource.

Aspect 11: A method for wireless communications at a network entity comprising: transmitting, to a UE, control signaling indicating a CLI measurement resource and a TCI state to apply for CLI measurement in the CLI measurement resource; and receiving, from the UE, a message indicating a CLI measurement of the CLI measurement resource measured at the UE using a beam associated with the TCI state.

Aspect 12: The method of aspect 11, wherein transmitting the control signaling comprises: transmitting an indication that the TCI state is associated with a downlink channel for the UE.

Aspect 13: The method of aspect 12, wherein transmitting the indication that the TCI state is associated with the downlink channel for the UE comprises: transmitting an indication of a unified TCI state.

Aspect 14: The method of any of aspects 11 through 13, further comprising: transmitting, to the UE, a downlink control information message indicating the TCI state.

Aspect 15: The method of any of aspects 11 through 14, further comprising: transmitting, to the UE, a control message indicating a set of TCI states associated with a set of CORESET pools, wherein each CORESET pool of the set of CORESET pools corresponds to one or more CORESETs; and transmitting, with the control signaling, an indication of a CORESET pool of the set of CORESET pools, wherein the TCI state is based at least in part on the indication of the CORESET pool.

Aspect 16: The method of aspect 15, wherein transmitting the indication of the CORESET pool of the set of CORESET pools comprises: transmitting the control signaling from a TRP associated with the CORESET pool, wherein each CORESET pool of the set of CORESET pools is associated with a respective TRP.

Aspect 17: The method of any of aspects 15 through 16, wherein transmitting the indication of the CORESET pool of the set of CORESET pools comprises: transmitting a first control message indicating the CLI measurement resource and a first CORESET pool of the set of CORESET pools; and transmitting a second control message indicating the CLI measurement resource and a second CORESET pool of the set of CORESET pools, wherein the message indicates a first CLI measurement measured at the UE using a first beam associated with a first TCI state associated with the first CORESET pool and a second CLI measurement measured at the UE using a second beam associated with a second TCI state associated with the second CORESET pool.

Aspect 18: The method of any of aspects 11 through 17, further comprising: transmitting, to the UE, a control message indicating a second TCI state associated with a set of CLI measurement resources comprising the CLI measurement resource, wherein the CLI measurement resource comprises an aperiodic or a semi-periodic CLI measurement resource; and transmitting, with the control signaling, an indication to overwrite the second TCI state with the TCI state for the CLI measurement resource.

Aspect 19: The method of any of aspects 11 through 18, wherein transmitting the control signaling comprises: transmitting a radio resource control message configuring the CLI measurement resource and the TCI state, wherein the CLI measurement resource comprises a periodic CLI measurement resource.

Aspect 20: The method of any of aspects 11 through 19, wherein the CLI measurement resource comprises a layer one sounding reference signal resource and a layer one received signal strength indicator resource.

Aspect 21: An apparatus for wireless communications at a UE, comprising a processor; memory coupled with the processor; and instructions stored in the memory and executable by the processor to cause the apparatus to perform a method of any of aspects 1 through 10.

Aspect 22: An apparatus for wireless communications at a UE, comprising at least one means for performing a method of any of aspects 1 through 10.

Aspect 23: A non-transitory computer-readable medium storing code for wireless communications at a UE, the code comprising instructions executable by a processor to perform a method of any of aspects 1 through 10.

Aspect 24: An apparatus comprising a processor; memory coupled with the processor; and instructions stored in the memory and executable by the processor to cause the apparatus to perform a method of any of aspects 11 through 20.

Aspect 25: An apparatus comprising at least one means for performing a method of any of aspects 11 through 20.

Aspect 26: A non-transitory computer-readable medium storing code the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
      receive, from a network entity, a control message that indicates a cross-link interference measurement resource, wherein the control message further indicates a transmission configuration indicator state the UE is to apply for cross-link interference measurement in the cross-link interference measurement resource, wherein the transmission configuration indicator state is a unified transmission configuration indicator state indicative of a common beam for a first downlink channel and at least one of a second downlink channel or an uplink channel;
      generate a cross-link interference measurement of the cross-link interference measurement resource using a receive beam associated with the transmission configuration indicator state; and
      transmit, to the network entity, a message indicating the cross-link interference measurement.

2. The apparatus of claim 1, wherein the instructions to receive the control message are executable by the one or more processors to cause the apparatus to:
 receive an indication that the transmission configuration indicator state is associated with a downlink channel for the UE.

3. The apparatus of claim 1, wherein the control message comprises a downlink control information message.

4. The apparatus of claim 1, wherein the instructions are further executable by the one or more processors to cause the apparatus to:
 receive a second control message indicating a set of transmission configuration indicator states associated with a set of control resource set pools, wherein each control resource set pool of the set of control resource set pools corresponds to one or more control resource sets; and
 receive, with the control message, an indication of a control resource set pool of the set of control resource set pools, wherein the transmission configuration indicator state is based at least in part on the indication of the control resource set pool.

5. The apparatus of claim 4, wherein the instructions to receive the indication of the control resource set pool of the set of control resource set pools are executable by the one or more processors to cause the apparatus to:
 receive the control message from a transmission and reception point associated with the control resource set pool, wherein each control resource set pool of the set of control resource set pools is associated with a respective transmission and reception point.

6. The apparatus of claim 4, wherein the instructions to receive the control message are executable by the one or more processors to cause the apparatus to:
 receive the control message indicating the cross-link interference measurement resource and a first control resource set pool of the set of control resource set pools; and wherein the instructions are further executable by the one or more processors to cause the apparatus to:
  receive a third control message indicating the cross-link interference measurement resource and a second control resource set pool of the set of control resource set pools; and
  generate a first cross-link interference measurement of the cross-link interference measurement resource using a first receive beam associated with a first transmission configuration indicator state associated with the first control resource set pool and generate a second cross-link interference measurement of the cross-link interference measurement resource using a second receive beam associated with a second transmission configuration indicator state associated with the second control resource set pool, wherein the message indicates the first cross-link interference measurement and the second cross-link interference measurement.

7. The apparatus of claim 1, wherein the instructions are further executable by the one or more processors to cause the apparatus to:
 receive a second control message indicating a second transmission configuration indicator state associated with a set of cross-link interference measurement resources comprising the cross-link interference measurement resource, wherein the cross-link interference measurement resource comprises an aperiodic or a semi-periodic cross-link interference measurement resource; and
 receive, with the control message, an indication to overwrite the second transmission configuration indicator state with the transmission configuration indicator state for the cross-link interference measurement resource.

8. The apparatus of claim 1, wherein the control message comprises a radio resource control message, and wherein the cross-link interference measurement resource comprises a periodic cross-link interference measurement resource.

9. The apparatus of claim 1, wherein the cross-link interference measurement resource comprises a layer one sounding reference signal resource or a layer one received signal strength indicator resource.

10. The apparatus of claim 1, wherein the first downlink channel comprises a physical downlink control channel, and wherein the second downlink channel comprises a channel state information reference signal.

11. The apparatus of claim 10, wherein the instructions to receive the control message are executable by the one or more processors to cause the apparatus to:
 receive an indication to update a serving beam associated with the physical downlink control channel to the receive beam associated with the transmission configuration indicator state, wherein the control message further indicates the transmission configuration indicator state the UE is to apply via indication of the update to the serving beam.

12. The apparatus of claim 1, wherein the transmission configuration indicator state is different from a second unified transmission configuration indicator state configured for a physical downlink control channel and a physical downlink shared channel for the UE.

13. An apparatus, comprising:
 one or more processors;
 one or more memories coupled with the one or more processors; and
 instructions stored in the one or more memories and executable by the one or more processors to cause the apparatus to:
  transmit, to a user equipment (UE), a control message that indicates a cross-link interference measurement resource, wherein the control message further indicates a transmission configuration indicator state the UE is to apply for cross-link interference measurement in the cross-link interference measurement resource, wherein the transmission configuration indicator state is a unified transmission configuration indicator state indicative of a common beam for a first downlink channel and at least one of a second downlink channel or an uplink channel; and
  receive, from the UE, a message indicating a cross-link interference measurement of the cross-link interference measurement resource measured at the UE using a beam associated with the transmission configuration indicator state.

14. The apparatus of claim 13, wherein the instructions to transmit the control message are executable by the one or more processors to cause the apparatus to:
 transmit an indication that the transmission configuration indicator state is associated with a downlink channel for the UE.

15. The apparatus of claim 13, wherein the control message comprises a downlink control information message indicating the transmission configuration indicator state.

16. The apparatus of claim 13, wherein the instructions are further executable by the one or more processors to cause the apparatus to:
 transmit, to the UE, a second control message indicating a set of transmission configuration indicator states associated with a set of control resource set pools, wherein each control resource set pool of the set of control resource set pools corresponds to one or more control resource sets; and
 transmit, with the control message, an indication of a control resource set pool of the set of control resource set pools, wherein the transmission configuration indicator state is based at least in part on the indication of the control resource set pool.

17. The apparatus of claim 16, wherein the instructions to transmit the indication of the control resource set pool of the set of control resource set pools are executable by the one or more processors to cause the apparatus to:
 transmit the control message from a transmission and reception point associated with the control resource set pool, wherein each control resource set pool of the set of control resource set pools is associated with a respective transmission and reception point.

18. The apparatus of claim 16, wherein the instructions to transmit the indication of the control resource set pool of the set of control resource set pools are executable by the one or more processors to cause the apparatus to:
 transmit the control message indicating the cross-link interference measurement resource and a first control resource set pool of the set of control resource set pools; and wherein the instructions are further executable to cause the apparatus to:
  transmit a third control message indicating the cross-link interference measurement resource and a second control resource set pool of the set of control resource set pools, wherein the message indicates a first cross-link interference measurement measured at the UE using a first beam associated with a first transmission configuration indicator state associated with the first control resource set pool and a second cross-link interference measurement measured at the UE using a second beam associated with a second transmission configuration indicator state associated with the second control resource set pool.

19. The apparatus of claim 13, wherein the instructions are further executable by the one or more processors to cause the apparatus to:
 transmit, to the UE, a second control message indicating a second transmission configuration indicator state associated with a set of cross-link interference measurement resources comprising the cross-link interference measurement resource, wherein the cross-link interference measurement resource comprises an aperiodic or a semi-periodic cross-link interference measurement resource; and
 transmit, with the control message, an indication to overwrite the second transmission configuration indicator state with the transmission configuration indicator state for the cross-link interference measurement resource.

20. The apparatus of claim 13, wherein the control message comprises a radio resource control message, wherein the cross-link interference measurement resource comprises a periodic cross-link interference measurement resource.

21. The apparatus of claim 13, wherein the cross-link interference measurement resource comprises a layer one sounding reference signal resource and a layer one received signal strength indicator resource.

22. A method for wireless communications at a user equipment (UE), comprising:
 receiving, from a network entity, a control message that indicates a cross-link interference measurement resource, wherein the control message further indicates a transmission configuration indicator state the UE is to apply for cross-link interference measurement in the cross-link interference measurement resource, wherein the transmission configuration indicator state is a unified transmission configuration indicator state indicative of a common beam for a first downlink channel and at least one of a second downlink channel or an uplink channel;
 generating a cross-link interference measurement of the cross-link interference measurement resource using a receive beam associated with the transmission configuration indicator state; and
 transmitting, to the network entity, a message indicating the cross-link interference measurement.

23. The method of claim 22, wherein receiving the control message comprises:
 receiving an indication that the transmission configuration indicator state is associated with a downlink channel for the UE.

24. The method of claim 22, wherein the control message comprises a downlink control information message.

25. The method of claim 22, further comprising:
 receiving a second control message indicating a set of transmission configuration indicator states associated with a set of control resource set pools, wherein each control resource set pool of the set of control resource set pools corresponds to one or more control resource sets; and
 receiving, with the control message, an indication of a control resource set pool of the set of control resource set pools, wherein the transmission configuration indicator state is based at least in part on the indication of the control resource set pool.

26. The method of claim 25, wherein receiving the indication of the control resource set pool of the set of control resource set pools comprises:
 receiving the control message from a transmission and reception point associated with the control resource set pool, wherein each control resource set pool of the set of control resource set pools is associated with a respective transmission and reception point.

27. The method of claim 25, wherein receiving the control message comprises:
 receiving the control message indicating the cross-link interference measurement resource and a first control resource set pool of the set of control resource set pools; and further comprising:
  receiving a third control message indicating the cross-link interference measurement resource and a second control resource set pool of the set of control resource set pools; and
  generating a first cross-link interference measurement of the cross-link interference measurement resource using a first receive beam associated with a first transmission configuration indicator state associated with the first control resource set pool and generating a second cross-link interference measurement of the cross-link interference measurement resource using a second receive beam associated with a second transmission configuration indicator state associated with the second control resource set pool, wherein the message indicates the first cross-link interference measurement and the second cross-link interference measurement.

28. The method of claim 22, further comprising:
receiving a second control message indicating a second transmission configuration indicator state associated with a set of cross-link interference measurement resources comprising the cross-link interference measurement resource, wherein the cross-link interference measurement resource comprises an aperiodic or a semi-periodic cross-link interference measurement resource; and
receiving, with the control message, an indication to overwrite the second transmission configuration indicator state with the transmission configuration indicator state for the cross-link interference measurement resource.

29. The method of claim 22, wherein the control message comprises a radio resource control message, wherein the cross-link interference measurement resource comprises a periodic cross-link interference measurement resource.

30. A method for wireless communications at a network entity comprising:

transmitting, to a user equipment (UE), a control message that indicates a cross-link interference measurement resource, wherein the control message further indicates a transmission configuration indicator state the UE is to apply for cross-link interference measurement in the cross-link interference measurement resource, wherein the transmission configuration indicator state is a unified transmission configuration indicator state indicative of a common beam for a first downlink channel and at least one of a second downlink channel or an uplink channel; and receiving, from the UE, a message indicating a cross-link interference measurement of the cross-link interference measurement resource measured at the UE using a beam associated with the transmission configuration indicator state.

* * * * *